United States Patent
Cho

(10) Patent No.: US 10,171,703 B2
(45) Date of Patent: Jan. 1, 2019

(54) MOBILE APPARATUS, IMAGE SCAN APPARATUS AND METHOD FOR PERFORMING A SCANNING OPERATION AND GENERATING A SCAN IMAGE

(71) Applicant: S-PRINTING SOLUTION CO., LTD., Suwon-si, Gyeonggi-do (KR)

(72) Inventor: Tae-gyun Cho, Hwaseong-si (KR)

(73) Assignee: HP PRINTING KOREA CO., LTD., Suwon-si (KR)

( * ) Notice: Subject to any disclaimer, the term of this patent is extended or adjusted under 35 U.S.C. 154(b) by 0 days.

(21) Appl. No.: 15/219,948

(22) Filed: Jul. 26, 2016

(65) Prior Publication Data
US 2017/0054866 A1    Feb. 23, 2017

(30) Foreign Application Priority Data
Aug. 21, 2015 (KR) .......................... 10-2015-0117967

(51) Int. Cl.
*H04N 1/32* (2006.01)
*H04N 1/00* (2006.01)

(52) U.S. Cl.
CPC ....... *H04N 1/32101* (2013.01); *H04N 1/0022* (2013.01); *H04N 1/00307* (2013.01); *H04N 1/32363* (2013.01); *H04N 1/32577* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 5,239,387 A | * | 8/1993 | Stein | G06F 5/06 358/444 |
| 5,768,483 A | * | 6/1998 | Maniwa | H04L 41/08 358/1.14 |
| 9,130,937 B1 | * | 9/2015 | Ostermann | H04L 63/0227 |
| 2004/0125400 A1 | * | 7/2004 | De Graaff | H04N 1/32101 358/1.15 |
| 2005/0078333 A1 | * | 4/2005 | Kobako | H04N 1/00204 358/1.15 |
| 2005/0134941 A1 | * | 6/2005 | Fukuda | H04N 1/00236 358/474 |

(Continued)

FOREIGN PATENT DOCUMENTS

| | | |
|---|---|---|
| EP | 2 725 478 | 4/2014 |
| JP | 2003018348 A * | 1/2003 |

(Continued)

OTHER PUBLICATIONS

Kawamura Yuichi, JP2003018348A [English Translation], Jan. 17, 2003, par 0022-0032, 0048.*

(Continued)

*Primary Examiner* — Miya J Williams
(74) *Attorney, Agent, or Firm* — Staas & Halsey LLP

(57) ABSTRACT

A mobile apparatus includes a user interface configured to allow a user to select an image scan apparatus, a communication interface configured to transmit a scan command to the selected image scan apparatus and receive a plurality of image data from the selected image scan apparatus via a streaming method, and a controller configured to generate a scan image using the plurality of image data.

20 Claims, 34 Drawing Sheets

(56) References Cited

U.S. PATENT DOCUMENTS

| | | | |
|---|---|---|---|
| 2009/0103124 A1 | 4/2009 | Kimura et al. | |
| 2010/0035637 A1* | 2/2010 | Varanasi | G01C 21/3682 455/457 |
| 2013/0100486 A1* | 4/2013 | Mccoog | G06F 3/1204 358/1.15 |
| 2013/0258381 A1* | 10/2013 | Sato | G06F 3/1297 358/1.13 |
| 2013/0329061 A1* | 12/2013 | Jeung | G06F 17/30265 348/207.1 |
| 2014/0111821 A1* | 4/2014 | Seo | H04N 1/00204 358/1.13 |
| 2014/0153066 A1 | 6/2014 | Booppanon et al. | |
| 2014/0155022 A1* | 6/2014 | Kandregula | G06Q 50/01 455/405 |
| 2014/0179370 A1 | 6/2014 | Dave et al. | |
| 2014/0198969 A1 | 7/2014 | McRae | |
| 2014/0253939 A1 | 9/2014 | Hashimoto | |
| 2014/0279579 A1 | 9/2014 | Huntsman | |
| 2015/0153975 A1* | 6/2015 | Mori | G06F 3/1206 358/1.14 |
| 2015/0207957 A1 | 7/2015 | Lee et al. | |
| 2015/0372988 A1* | 12/2015 | Tredoux | H04L 63/0823 380/243 |
| 2015/0378709 A1* | 12/2015 | D'Amico | H04W 4/001 717/176 |
| 2016/0179449 A1 | 6/2016 | Cho | |
| 2016/0191728 A1* | 6/2016 | Minami | H04N 1/00307 358/1.15 |
| 2016/0212114 A1* | 7/2016 | Kuroyanagi | G06F 13/00 |
| 2016/0219190 A1* | 7/2016 | Sugiyama | H04L 51/22 |
| 2016/0286053 A1* | 9/2016 | Akamine | H04N 1/0023 |

FOREIGN PATENT DOCUMENTS

| | | |
|---|---|---|
| JP | 2011087226 A | 4/2011 |
| JP | 2014192824 A | 10/2014 |
| JP | 2015103184 A | 6/2015 |
| KR | 101143809 B1 | 5/2012 |
| KR | 1020160076371 | 6/2016 |

OTHER PUBLICATIONS

International Written Opinion dated Sep. 27, 2016 from International Patent Application No. PCT/KR2016/006564, 8 pages.
International Search Report dated Sep. 27, 2016 from International Patent Application No. PCT/KR2016/006564, 3 pages.

* cited by examiner

MOBILE APPARATUS, IMAGE SCAN APPARATUS AND METHOD FOR PERFORMING A SCANNING OPERATION AND GENERATING A SCAN IMAGE

RELATED APPLICATIONS

This application claims priority from Korean Patent Application No. 10-2015-0117967, filed on Aug. 21, 2015 in the Korean Intellectual Property Office, the disclosure of which is incorporated herein by reference in its entirety.

BACKGROUND

Apparatuses and methods consistent with what is disclosed herein relate to a mobile apparatus, an image scan apparatus, and a method for processing a job, and more specifically, to a mobile apparatus configured to expand functions of an image scan apparatus by using functions of the mobile apparatus, the image scan apparatus, and a method for processing a job.

Recently, bring-your-own-device (BYOD) environment using a personal mobile apparatus for work-related process has been introduced and used in various fields. Various technologies that can easily manipulate functions of an image scan apparatus (or image forming apparatus) from a personal mobile apparatus have also been developed.

"BYOD" refers to utilization of a personal apparatus for a corporate work-related process. In other words, it means that information, devices and systems of a corporation can be accessed by a laptop, a smart phone, or a tablet. For example, a worker may access a company system and do his or her work from a laptop he or she carries around, instead of having to work on the desktop located in the office.

With a BYOD environment, workers will be relieved of the inconvenience of having to carry several devices for personal use and corporate use. Thus, there will be increased productivity and lower spending for equipments.

SUMMARY

According to an embodiment, a technical objective is to provide a mobile apparatus that can expand functions of an image scan apparatus by using functions of the mobile apparatus, the image scan apparatus and a method for processing a job.

According to an embodiment, a mobile apparatus is provided, which may include a user interface configured to allow a user to select an image scan apparatus, a communication interface configured to transmit a scan command to the selected image scan apparatus and receive a plurality of image data from the selected image scan apparatus via a streaming method, and a controller configured to generate a scan image using the plurality of image data.

A size of each of the plurality of image data may be limited by a size of a scan buffer of the image scan apparatus.

The communication interface may is configured to communicate with the selected image scan apparatus with a unified protocol.

The scan command may include open Application Programming Interface (API) commands recognized by the selected image scan apparatus.

The controller may be configured to control the communication interface to transmit the generated scan image to the selected image scan apparatus and to an image forming apparatus.

The user interface may be configured to receive an edit command regarding the generated scan image, and the controller is configured to edit the generated scan image in response to the received edit command.

The controller may be configured to control the communication interface to transmit the generated scan image to at least one of email transmission server, fax transmission server and file transport protocol (FTP) server.

The communication interface may be configured to receive address book information stored in the image scan apparatus from the image scan apparatus, the user interface is configured to display an address book corresponding to the received address book information and receive selecting of at least one on the displayed address book, and the controller is configured to control the communication interface to transmit the generated scan image to the address corresponding to the selected address.

The mobile apparatus may be configured to store address book information, wherein the user interface is configured to receive selecting of at least one on the address book corresponding to the stored address book information, and the communication interface is configured to transmit address information corresponding to the selected address book to the selected image scan apparatus.

The mobile apparatus may additionally include a position measuring sensor configured to generate position information by measuring a position of the mobile apparatus, wherein the controller reflects the position information on the generated scan image.

The controller may be configured to perform a text recognition function on the generated scan image.

The communication interface may be configured to receive a document file stored in the selected image scan apparatus from the selected image scan apparatus, the user interface is configured to receive an edit command regarding the received document file, and the controller is configured to edit the received document file according to the edit command and control the communication interface to transmit the edited document file to the image scan apparatus.

According to an embodiment, an image scan apparatus is provided, which may include a communication interface configured to receive a scan command from a mobile apparatus, a scanner configured to scan a source material to a plurality of image data, and a controller configured to control the communication interface to transmit the plurality of image data outputted from the scanner to the mobile apparatus via a streaming method.

The communication interface may be configured to receive at least one of position information and time information from the mobile apparatus, and the controller is configured to reflect at least one of the received position information and the received time information into the plurality of image data.

According to an embodiment, a job performing method of a mobile apparatus is provided, which may include receiving a selection of an image scan apparatus to perform scanning, transmitting a scan command to the selected image scan apparatus, receiving a plurality of image data from the selected image scan apparatus via a streaming method, and generating a scan image using the plurality of image data.

A size of each of the plurality of image data is limited by a size of a scan buffer of the image scan apparatus.

The transmitting the scan command and receiving the plurality of image data comprises transmitting and receiving the scan command and the plurality of image data, respectively, by using a unified protocol that transmits the scan command and the plurality of image data to a same port.

The scan command comprises open Application Programming Interface (API) commands recognized by the selected image scan apparatus.

According to an embodiment, a job performing method of an image scan apparatus is provided, which may include receiving a scan command from a mobile apparatus, scanning a source material to a plurality of image data, and transmitting the plurality of image data to the mobile apparatus via a streaming method.

According to an embodiment, a non-transitory computer readable recording medium comprising a program to implement a job performing method of a mobile apparatus, in which the job performing method may include receiving selection of an image scan apparatus to perform scanning, transmitting a scan command to the selected image scan apparatus, receiving a plurality of image data from the selected image scan apparatus via a streaming method, and generating a scan image using the plurality of image data.

BRIEF DESCRIPTION OF THE DRAWINGS

The above and/or other aspects described in the present disclosure will be more apparent by the description of various exemplary embodiments with reference to the accompanying drawings, in which.

DETAILED DESCRIPTION

Figure 1:
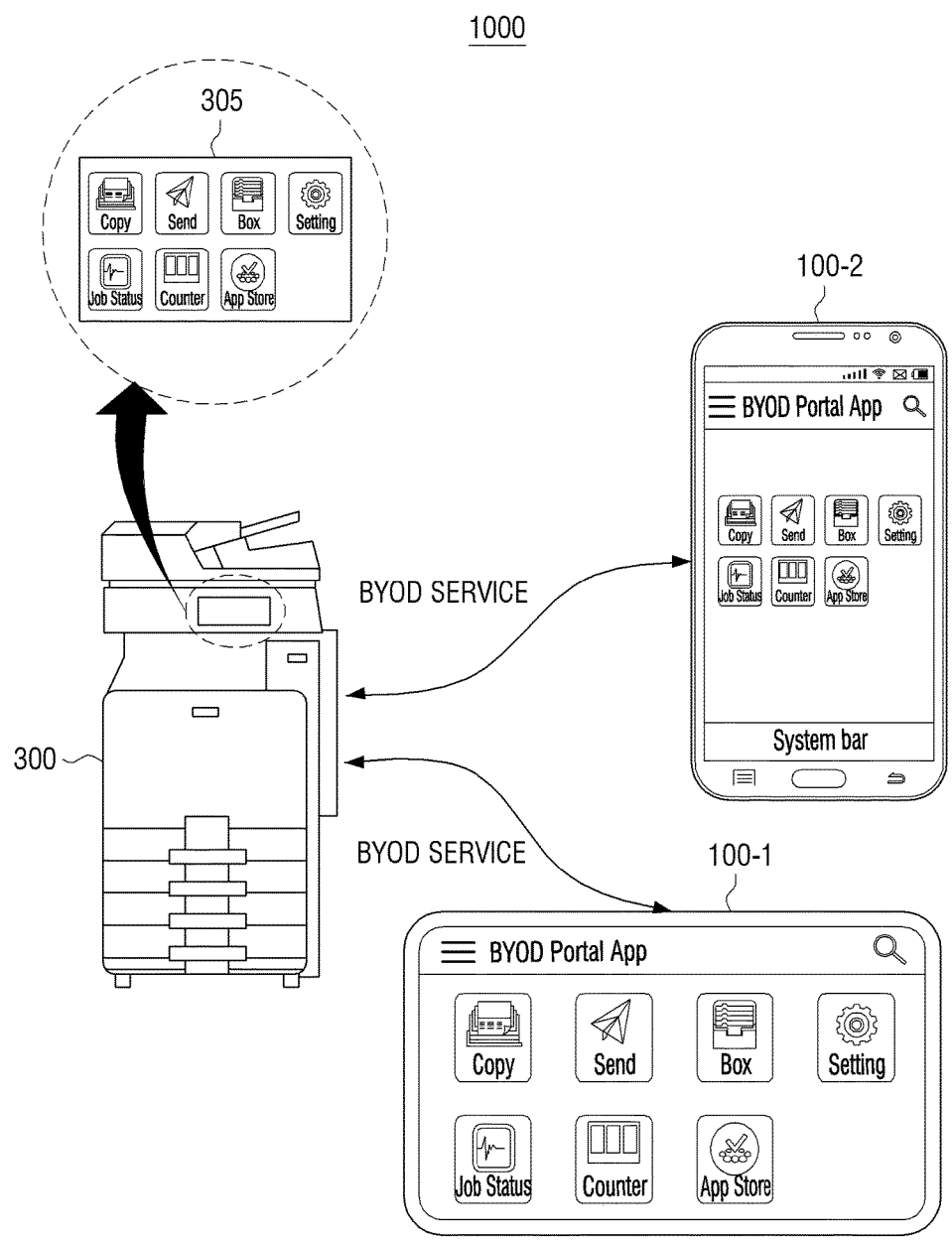
FIG. 1 is a block diagram illustrating bring-your-own-device (BYOD) environment according to an embodiment.

Various exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the various embodiments. Accordingly, it is apparent that some embodiments of the present inventive concept can be carried out without those specifically defined matters. Also, well-known functions or constructions are not described in detail since they would obscure the disclosure with unnecessary detail.

The expression such as "first" or "second" may be used to describe a variety of elements, but the elements should not be limited by these expressions. The expressions are used only for the purpose of distinguishing one element from another.

The terminology used herein is provided only to describe various embodiments, and not to be construed as limiting the present disclosure. A singular expression encompasses a plural expression, unless specified to the contrary. It should be understood that the term "comprise" or "include" as used herein refers to a presence of characteristic, number, step, operation, element, part, or a combination of these, but not to foreclose the existence of, or possibility of adding one or more of another characteristics, numbers, steps, operations, elements, parts or a combination of these.

In describing exemplary embodiments, a "module" or a "unit" performs at least one function or operation and may be implemented as hardware or software, or as a combination of hardware and software. Further, except for the "module" or the "unit" that is necessarily implemented as a specific hardware, a plurality of "modules" or a plurality of "units" may be integrated as at least one module and implemented to be executed in part or whole by at least one processor.

FIG. 1 is a block diagram of bring-your-own-device (BYOD) environment according to an embodiment.

Referring to FIG. 1, a BYOD system 1000 includes a mobile apparatus 100 and an image scan apparatus 300. A user in BYOD environment may manipulate various functions of the image scan apparatus 300 from a mobile apparatus 100-1 or a mobile apparatus 100-2 by using BYOD service.

The image scan apparatus 300 may generate scan images by scanning source materials. Specifically, the image scan apparatus 300 may transmit the generated scan images to the mobile apparatuses 100-1, 100-2.

When the image scan apparatus 300 has limited storage resources, instead of saving the scan images and then transmitting them, the image scan apparatus 300 may stream the image data to the mobile apparatuses 100-1, 100-2. The size of the streamed image data may correspond to the size of a buffer in which the generated data is temporarily stored during the scanning by the image scan apparatus 300. This will be specifically explained below by referring to FIG. 6.

When the image scan apparatus 300 is a multi-function peripheral (MFP) that can perform printing as well as scanning, it may be referred to as an "image forming apparatus." Specific configuration and operation of the image scan apparatus 300 will be described below by referring to FIG. 5.

Further, the image scan apparatus may be connected to one or more mobile apparatuses 100-1, 100-2 to control a corresponding image scan apparatus 300. Herein, "BYOD service" is a relatively narrower concept than the general meaning of BYOD, as it may refer to a function of accessing the image scan apparatus 300 with a personal device and sharing resource of the image scan apparatus 300 with the personal device. Furthermore, the "BYOD environment" may indicate a network system for using the BYOD service.

In order to use the BYOD service, a BYOD application may be installed on the BYOD-supported mobile apparatus 100-1 or mobile apparatus 100-2. The BYOD application may be named as, for example, BYOD portal app. In view of the fact that the mobile apparatus 100-1 or 100-2 supports BYOD, it may be named as BYOD apparatus.

When the BYOD application is installed on the mobile apparatus 100-1 or on the mobile apparatus 100-2, the mobile apparatus 100-1 or the mobile apparatus 100-2 may control functions of the image scan apparatus 300 by transmitting a control command to the image scan apparatus 300.

The BYOD application may control the image scan apparatus 300 by using open Application Programming Interface (API). The mobile apparatus 100-1 or the mobile apparatus 100-2 and the image scan apparatus 300 may be wirelessly connected to each other through, for example, the uniform Access Point (AP) or through Wi-Fi Direct. Specific constitution of the mobile apparatuses 100-1, 100-2 will be described below by referring to FIGS. 2 and 3.

The image scan apparatus 300 may be provided with a manipulator 305. A user may manipulate the image scan apparatus 300 through the manipulator 305. The manipulator 305 may include a display 320 (FIG. 5) displaying Graphic User Interface (GUI) screen and an inputter 330 (FIG. 5) receiving a user input.

The manipulator 305 and the mobile apparatus 100-1 or the mobile apparatus 100-2 may independently include User Interface (UI) contents. Specifically, the mobile apparatus 100-1 or the mobile apparatus 100-2 may display UI contents to manipulate the image scan apparatus 300. The mobile apparatus 100-1 or the mobile apparatus 100-2 may display UI contents as displayed on the manipulator 305, or display independent UI contents different from the UI contents displayed on the manipulator 305. For example, the image scan apparatus 300 may independently provide UI contents to implement various functions of the image scan apparatus 300 such as copying, scanning and so on, to the BYOD application of the mobile apparatus 100-1 or the mobile apparatus 100-2.

A user may perform every manipulation that can be performed on the manipulator 305 through the mobile apparatus 100-1 or the mobile apparatus 100-2. Thus, according to an embodiment, a user may manipulate the image scan apparatus 300 by using his or her mobile apparatus 100-1 or mobile apparatus 100-2. Furthermore, a user may conveniently print a file stored in the mobile apparatus 100-1 or the mobile apparatus 100-2, or perform an imaging job (e.g., scan-to-email or scan-to-cloud) by using the address book stored in the mobile apparatus 100-1 or the mobile apparatus 100-2. Therefore, enhanced user convenience can be expected.

When the image scan apparatus 300 has limited storage resources, the image scan apparatus 300 may not generate a whole scan image by combining scan image data of strips of the original document. Rather, the image scan apparatus 300 may stream the consecutively generated image data to the mobile apparatus 100. The mobile apparatus 100 receiving the streamed image data may generate the scan images by combining the plurality of image data. Accordingly, the image scan apparatus 300 may perform a relatively faster scan.

In order to perform BYOD service for controlling the image scan apparatus 300, the mobile apparatus 100-1 or the mobile apparatus 100-2 may be connected to the image scan apparatus 300. According to an embodiment, connecting for BYOD service may be referred to as "pairing." The connecting for BYOD service will be specifically explained below by referring to drawings.

As illustrated in FIG. 1, it is assumed that the mobile apparatus 100-1 is a tablet device, and the mobile apparatus 100-2 is a smart phone. However, note that this is provided for convenience of explanation, and various embodiments may not be limited to herein. Thus, in addition to the tablet device and the smart phone, the mobile apparatus 100-1 or the mobile apparatus 100-2 may be various apparatuses equipped with a display screen, such as laptop, PDA, wearable device (watch or glasses), and so on.

Furthermore, although the mobile apparatuses 100-1, 100-2 are connected to one image scan apparatus in FIG. 1 for ease of description, the mobile apparatus may be connected to a plurality of the image scan apparatuses in various implementations.

Additionally, although the mobile apparatus 100-1 or 100-2 and the image scan apparatus 300 are described to be directly connected to each other, in various implementations, a connection may be indirect by way of another element such as a router or an external internet network. Also, although each apparatus is exemplified to be connected wirelessly, a connection may be performed via wire in various implementations.

Figure 2:
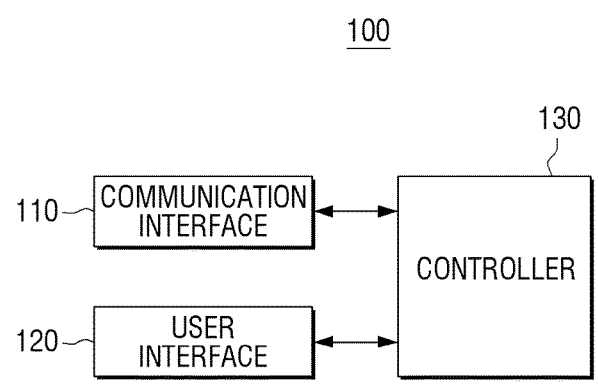
FIG. 2 is a brief block diagram of the mobile apparatus in FIG. 1.

FIG. 2 is a brief block diagram of the mobile apparatus in FIG. 1.

Referring to FIG. 2, the mobile apparatus 100 may include a communication interface 110, a user interface 120 and a controller 130. The mobile apparatus 100 may be meant for a desktop or a kiosk as well as a device that can be carried around, such as, smart phone, tablet, MP3 player, and so on.

The communication interface 110 may be formed to connect the mobile apparatus 100 with an external device through Universal Serial Bus (USB) port and wireless module(s) as well as through Local Area Network (LAN) and internet network. The wireless module(s) may support one or more of WiFi, WiFi Direct, near field communication (NFC), Bluetooth, infrared (IR), and so on.

The communication interface 110 may transmit a job execute request to the image scan apparatus 300. The job execute request may be scan command, copy command, fax transmit command, and so on, that are related with the functions that can be performed by the image scan apparatus 300. Furthermore, under the BYOD environment according to an embodiment, functions of another image scan apparatus and functions of the mobile apparatus 100 may be used. Thus, a job execute request for a function that cannot be performed by the image scan apparatus 300 may be received from a user. For example, a user may transmit a copy command to the image scan apparatus 300 that only has a scanning function. The image scan apparatus 300 may perform scanning in response to the copy command, transmit the scan result to another image forming apparatus so that the other image forming apparatus can print the copy. In various implementations, the mobile apparatus 100 may be a relay device that may receive the scan result and transmit the scan result to another image forming apparatus to perform the print job.

Furthermore, the communication interface 110 may receive the scan image from the image scan apparatus 300, or receive a plurality of streamed image data constituting the scan images. As explained, the image data may be raw data stored in the scan buffer of the image scan apparatus.

The communication interface 110 may receive a scan command, a scan image, or the image data by using a unified protocol. The unified protocol may be a protocol for performing transmission of the command and the transmission and reception of the data with a same port, which will be specifically explained below by referring to FIGS. 6 and 7.

Furthermore, the communication interface 110 may transmit the image data previously stored in the mobile apparatus 100, the document data, and the edited image data to the image scan apparatus 300 or to the other adjacent image forming apparatuses. For example, when the image scan apparatus 300 supports printing function, the communication interface 110 may transmit a print file to the image scan apparatus 300. The print file may be in a printer language data such as Postscript (PS) and Printer Control Language (PCL) or may be files such as PDF, XPS, BMP, JPG, and so on.

Furthermore, the communication interface 110 may transmit the scan image received from the image scan apparatus 300 or the scan image generated or edited at the mobile apparatus 100 to an email transmission server, a fax transmission server, an FTP server, and so on. Thus, even when the image scan apparatus 300 does not support the function of transmitting the scanned document as an email, a user may perform the scan-to-email function by combining the resource of the mobile apparatus 100. Furthermore, even when the image scan apparatus does not support the scan transmitting function, the mobile apparatus 100 may receive the scanned document and transmit it to an external fax server, thus providing the user with fax transmitting function.

The communication interface 110 may transmit, for example, the address book information previously stored in the mobile apparatus 100, the position information and the time information measured by a position measuring sensor 150, which will be described below, to the image scan apparatus 300. Furthermore, the communication interface 110 may receive the address book information previously stored in the image scan apparatus 300 from the image scan apparatus 300. Address book information may comprise, for example, email addresses, file transfer protocol (FTP) addresses, server addresses, and the like.

The user interface 120 may display various pieces of information provided from the mobile apparatus 100. Specifically, the user interface 120 may display a user interface window to receive a user's selection of various functions provided from the image scan apparatus 300.

Furthermore, the user interface 120 may receive a user's selection the adjacent devices to execute a job, and receive input of a job command (e.g., scan command) that will be performed by the selected device. The user interface 120 may be implemented as a combination of the display apparatus such as a monitor (e.g., LCD, CRT, and so on) and the input device such as a plurality of buttons, a keyboard, a mouse, and so on. Furthermore, the user interface 120 may be implemented as a touch screen that can simultaneously perform the displaying function and the inputting function.

A scan command may be a command to perform a scan job only. Otherwise, a scan command may be a command such as scan-to-server command, scan-to-DLNA command, scan-to-cloud command, and so on, which transmits the scan job to a specific server. When a scan command inputted by a user is scan-to-server command, scan-to-DLNA command, or scan-to-cloud command, the user interface 120 may receive from a user an input of the address information to which to send the scanned document.

The user interface 120 may receive the address information by receiving a selection of one of the address books previously stored in the mobile apparatus 100. Furthermore, the user interface 120 may receive input of the address information by displaying the address book information received from the image scan apparatus 300 and receiving a selection of an address.

Furthermore, when the image scan apparatus 300 is an MFP that can print and copy, a scan command may be a copy command using the scanning function.

Furthermore, the user interface 120 may receive an edit command. Specifically, the user interface 120 may receive an edit command regarding the scan images and the document files by receiving the pre-stored image data and document file from a user or the image scan apparatus.

The user interface 120 may also display the editing result according to the inputted edit command. The user interface window that can be displayed by the user interface 120 will be described below by referring to FIGS. 16 to 32.

The controller 130 may control each element of the mobile apparatus 100. Specifically, the controller 130 may perform a function according to the user command inputted through the user interface 120 or transmit a job execute request according to a user command to the image scan apparatus that can be connected.

Furthermore, when a plurality of the image data are received through the communication interface 110, the controller 130 may generate a scan image by using the plurality of the image data. The controller 130 may generate the scan image by using the position information generated at the position measuring sensor 150. This will be described below. Although it is stated above that the position information is used by the mobile apparatus, in various implementations, the position information may be transmitted from the mobile apparatus 100 to the image scan apparatus 300, and the image scan apparatus 300 may use the position information.

The controller 130 may also perform optical character recognition (OCR) function regarding the generated scan image, incorporate the character identifying result, and generate the scan image again.

Furthermore, the controller 130 may control the communication interface 110 to re-transmit the generated scan image to the image scan apparatus 300 or transmit to another image forming apparatus.

The controller 130 may also perform editing on the scan image according to edit commands inputted through the user interface 120.

As described above, because the mobile apparatus 100 may control the functions of the image scan apparatus 300, a user can easily control the image scan apparatus 300 from a remote position. Accordingly, the mobile apparatus 100 may provide BYOD service and may be able to offer to the user various other functions as well as functions provided by the image scan apparatus 300.

The mobile apparatus 100 according to an embodiment may generate the scan image by receiving streamed image data rather than receiving the whole scan image from the image scan apparatus 300. Thus, the functions of the image scan apparatus 300 that has limited storage resources can be expanded.

Meanwhile, although a simple configuration of the mobile apparatus 100 is illustrated and described by way of example, other various elements may be additionally included in various implementations. This will be explained below by referring to FIG. 3.

Figure 3:
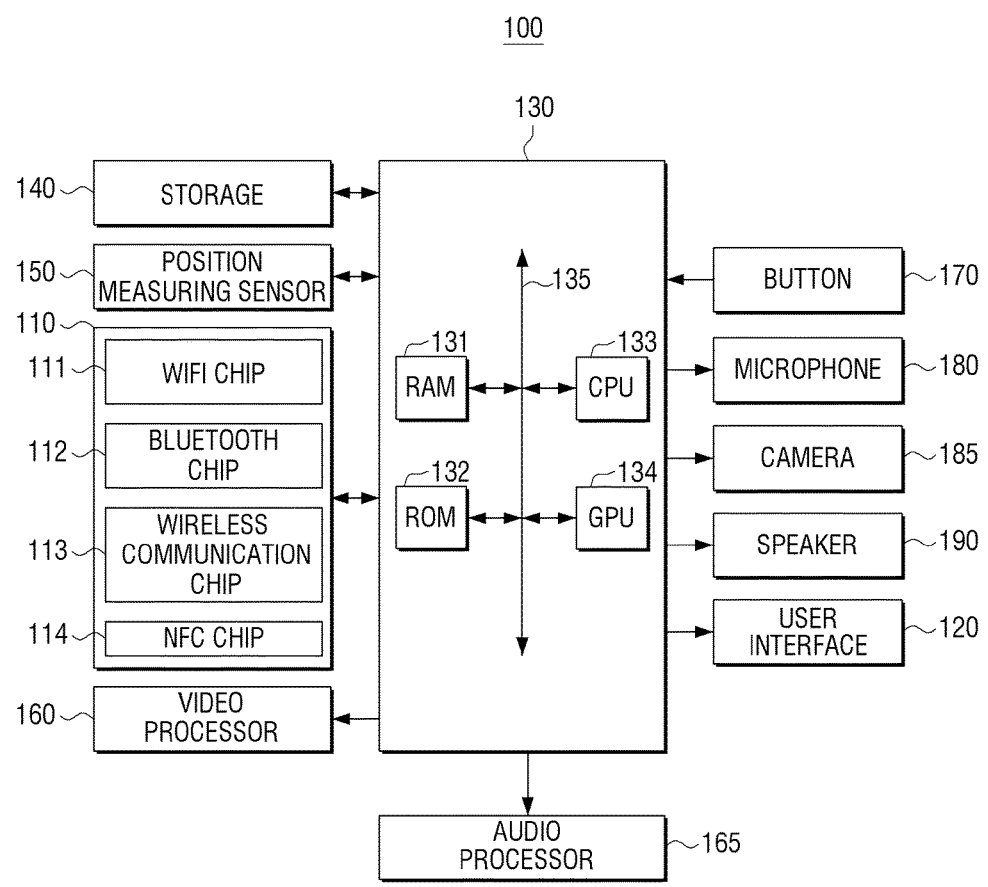
FIG. 3 is a detailed block diagram of the mobile apparatus in FIG. 1.

FIG. 3 is a detailed block diagram of the mobile apparatus in FIG. 1.

Referring to FIG. 3, the mobile apparatus 100 includes a communication interface 110, a user interface 120, a controller 130, storage 140, a position measuring sensor 150, a video processor 160, an audio processor 165, a button 170, a microphone 180, a camera 185, and a speaker 190.

The communication interface 110 is configured to perform communication with various types of external devices using various forms of communication methods. The communication interface 110 may include a WiFi module 111, a Bluetooth module 112, a wireless communication module 113, and an NFC module 114. The controller 130 may perform communication with various external devices by using the communication interface 110.

The WiFi module 111 and Bluetooth module 112 may perform communication according to WiFi standards and Bluetooth standards, respectively. When using the WiFi module 111 or the Bluetooth module 112, various connecting information such as service set identifier (SSID), session key, and so on, may be first transmitted and received. The communication may be connected by using the connecting information, and various pieces of information may be transmitted and received. The wireless communication module 113 refers to a module that performs the communication according to various communication standards from groups such as IEEE, ZigBee, $3^{rd}$ Generation (3G), $3^{rd}$ Generation Partnership Project (3GPP), and Long Term Evolution (LTE). The NFC module 114 refers to a module that operates with Near Field Communication (NFC) standard using, for example, 13.56 MHz frequency from among various RF-ID frequency bandwidths available such as 135 kHz, 13.56 MHz, 433 MHz, 860-960 MHz, 2.45 GHz, and so on.

The user interface 120 may be implemented with, for example, liquid crystal display (LCD), organic light emitting diodes (OLED) display, plasma display panel (PDP), and so on. Within the user interface 120, a driving circuit that can be implemented as TFT, low temperature polysilicon (LTPS) TFT, organic TFT (OTFT), and so on, and a backlight unit may also be included.

The user interface 120 may also include a touch sensor that senses touch gestures of a user. The touch sensor may be implemented with various types of sensors such as capacitive, resistive, piezoelectric, and so on. Capacitive sensing involves use of dielectric materials coated on the surface of the touch screen where a touch coordinate value is calculated by sensing the change in capacitance due to a part of the user body touching the touch screen. Resistive sensing involves use of two electrode plates embedded within the touch screen, in which the upper and the lower plate are brought into contact with each other at a touched point as a user touches the screen. A touch coordinate value is calculated by sensing the electric current that flows because of the contact of the upper and lower plates. Moreover, when the mobile apparatus 100 supports a pen inputting function, the user interface 120 may sense user gestures using the inputting means such as pen in addition to the fingers. When the inputting means is a stylus pen including coils therein, the mobile apparatus 100 may include a magnetic sensor that can sense change in the magnetic field due to the coils in the stylus pen. Accordingly, a proximate gesture ("hovering") as well as touch gestures may be sensed.

Although the above explains that one user interface 120 performs displaying of the image and sensing of the touch gestures, in various implementations, the displaying function and the gesture sensing function may be performed by different modules. Thus, the user interface 120 may be implemented with a display apparatus capable of displaying images and a touch panel capable of sensing touch.

The storage 140 may store various programs and data necessary for operation of the mobile apparatus 100. Specifically, the storage 140 may store programs and data to create various UIs that will be displayed on the user interface 120.

Furthermore, the storage 140 may store a plurality of applications. One of the plurality of applications may be a BYOD application to support the various operations described above.

The storage 140 may also store address book information and workflow. "Workflow" refers to a plurality of previously-defined job flows. Workflow may include jobs that use the functions performed by several devices as well as functions performed at one device. For example, a user may have previously registered the scanning function of the image scan apparatus and the editing function of the mobile apparatus as one workflow.

The controller 130 may display a user interface window on the user interface 120 by using the programs and the data stored in the storage 140. The controller 130 includes RAM 131, ROM 132, CPU 133, graphic processing unit (GPU) 134, and the bus 135. RAM 131, ROM 132, CPU 133, and GPU 134 may be connected to each other through the bus 135.

CPU 133 may perform booting by accessing the storage 140 and using the program stored in the storage 140. CPU 133 may also perform various operations by using various programs, contents and data stored in the storage 140.

ROM 132 may store a command set (boot program) for system booting. When power-on or re-boot occurs, CPU 133 may copy the stored boot program in the storage 140 to RAM 131, and boot the system by executing the boot program. When the booting is completed, CPU 133 may copy various programs stored in the storage 140 to RAM 131, and perform various operations by executing the copied programs in RAM 131.

GPU 134 may display UI on the user interface 120 when booting of the mobile apparatus 100 is completed. Specifically, GPU 134 may generate a screen including various objects such as icons, images, texts, and so on, by using an operator (not illustrated) and a renderer (not illustrated). The operator may calculate attribute values such as coordinate value, shape, size, color, and so on, in which each object will be displayed according to the layout of the screen. The renderer may generate the screen in various layouts including objects, based on the attribute values calculated by the operator. The screen generated at the renderer may be provided to the user interface 120.

The position measuring sensor 150 may receive GPS signals from the global positioning system (GPS) satellites, and generate current position of the mobile apparatus 100 as position information. When a navigation program is used, or when current position of a user is necessary, the controller 130 may calculate the user position by using the position measuring sensor 150. Although the position information may be generated by using GPS signals, various embodiments may have the position measuring sensor 150 generate the position information by receiving satellite signals other than GPS satellites, or by using cellular base station information, or WiFi signal for the wireless communication.

The video processor 160 is configured to process the contents received through the communication interface 110 or the video data included in the contents stored in the storage 140. The video processor 160 may perform various image processing regarding the video data, such as decoding, scaling, noise filtering, frame rate conversion, resolution conversion, and so on. Such video processor 160 may be implemented as digital signal processor (DSP), and exclusively process an editing operation according to an edit command regarding the scan image. Accordingly, when an edit command regarding the scan image or the document files is inputted, the controller 130 may perform editing operation by using the video processor 160.

The audio processor 165 is configured to process the contents received through the communication interface 110 or the audio data included in the contents stored in the storage 140. The audio processor 165 may perform various processing regarding the audio data such as decoding, amplifying, noise filtering, and so on.

The controller 130 may play back corresponding contents with the video processor 160 and the audio processor 165 when a play-back application for multimedia contents is implemented. The speaker 190 may output the audio data generated by the audio processor 165.

The button 170 may be various types of buttons such as mechanical buttons, touch pad, wheel, and so on, which may be formed on an area such as front, side, or back of the exterior main body. Although the above distinguishes the button 170 from the user interface 120, the button 170 may be one of parts within the user interface 120.

The microphone 180 is configured to receive input of user voices or other sounds and converts the same into the audio data. The controller 130 may convert a user voice inputted through the microphone 180 into the audio data to be stored in the storage 140.

The camera 185 is configured to photograph still images or video images as controlled by a user. The camera 185 may be implemented as a plurality of cameras, such as, a front camera, a back camera, and so on. As described above, the camera 185 may be used for acquiring an image of a user to, for example, track the user's gaze.

When the camera 185 and the microphone 180 are provided, the controller 130 may perform control operation according to a user voice inputted through the microphone 180 or user motion perceived by the camera 185. Thus, the mobile apparatus 100 may operate in a motion control mode or a voice control mode. When operating in the motion control mode, the controller 130 may photograph a user by activating the camera 185, tracks changes in the user motion and perform the corresponding control operation. When operating in the voice control mode, the controller may analyze the user voice inputted through the microphone 180 and perform the control operation according to the analyzed user voice.

The mobile apparatus 100 supporting motion control mode or voice control mode may be used with motion recognition technology or voice recognition technology, respectively, in various embodiments. For example, when a user makes a gesture as if he or she is selecting an object displayed on home screen, or when a user speaks a voice command corresponding to the object, the mobile apparatus 100 may determine that the corresponding object is selected and perform the control operation matching the object.

Although not illustrated in FIG. 3, the mobile apparatus 100 according to various embodiments may also include a USB port for a USB connector, various external ports to be connected with various external components such as headset, mouse or LAN, digital multimedia broadcasting (DMB) module for receiving and processing DMB signals, and various other sensors.

As described above, the storage 140 may store the various programs.

Figure 4:
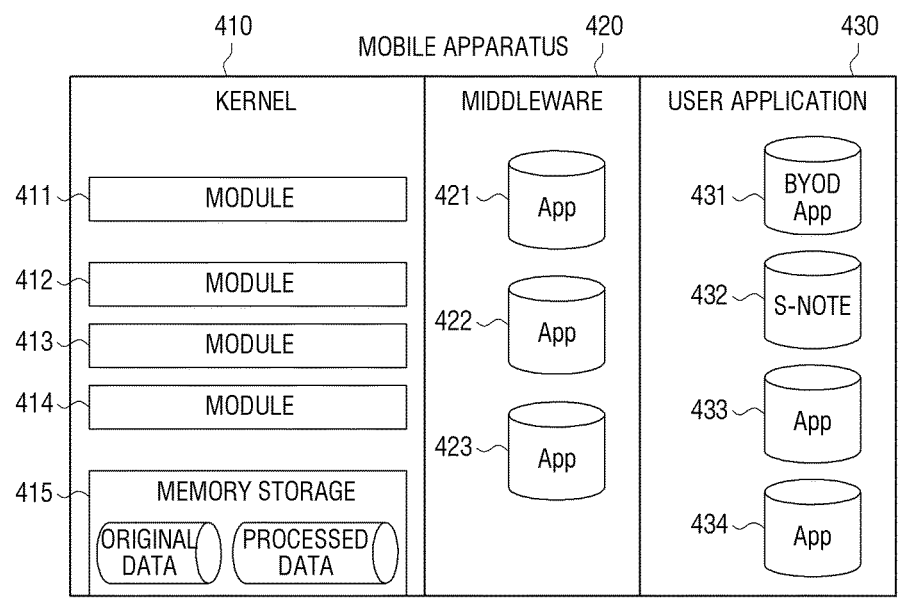
FIG. 4 illustrates an example regarding software structure in the mobile apparatus.

FIG. 4 is a diagram provided to explain software structure stored in the mobile apparatus 100.

Referring to FIG. 4, the storage 140 may store software including the kernel 410, the middleware 420, the application module 430, and so on. Portions of the kernel 410 and the middleware 420 may be considered to be part of an operating system (OS).

The OS may perform a function to control and manage overall operation of the hardware. Thus, OS is a layer that manages the basic functions such as hardware management, memory, security, and so on.

The kernel 410 may comprise various software modules 411, 412, 413, 414, 415, and the like to interface with and/or control various hardware devices such as the controller 130, the audio processor 165, the user interface 120, the camera 185, the storage 140, the communication interface 110, and the like. For example, the kernel 410 may play a role in delivering the touch signal sensed in the user interface 120 and various other signals from, for example, communication interface 110, the camera 185, and so on, to the middleware 420.

The middleware 420 may include various software modules 421, 422, 423 to control the operation of the mobile apparatus 100. The middleware may operate, for example, between higher level applications or programs and lower level programs such as the kernel. In some systems, the middleware 420 may serve to connect a higher level program from, for example, databases.

The application module 430 may include applications 431, 432, 433, and 434 to support various functions. For example, the application module 430 may include a program module to provide various services such as BYOD application 431, S-note module 432, cloud modules 433, 434, and so on. The applications may be installed by default, or installed by a user during use. When an object is selected, CPU 133 may execute an application corresponding to the selected object by using the application module 1240.

The software structure illustrated in FIG. 4 is merely one of many embodiments, and various embodiments are not limited by FIG. 4. Thus, certain elements may be deleted, modified or added according to need. For example, the storage 140 may additionally include a sensing module to analyze the signals sensed in the various sensors, messaging module such as OCR program, messenger program, Short Message Service (SMS) & Multimedia Message Service (MMS) program, and email program, call info aggregator program module, VoIP module, web browser module, and so on.

In using the scanning resource of an image scan apparatus, the mobile apparatus according to an embodiment may perform scan-to-mobile function without limitations on the size/number of the images, or limitations on the mass storage or the applied memory that can be used by the image scan apparatus.

A mobile apparatus according to an embodiment may use an API that manages communication and control for the BYOD application 431 and an image scan apparatus when transmitting images. Thus, the mobile apparatus may control under the minimum allowable conditions for the open API using environment, without having security issue such as port allowance on the network that can be a problem when using another protocol such as SMB/FTP. A user may install the BYOD application 431, and not set up an environment for using the SMB/FTP protocol. Accordingly, the user convenience can be enhanced.

The mobile apparatus according to an embodiment may perform various operations by combining various resources provided by an image scan apparatus with the hardware functions and the software functions of a mobile apparatus. Therefore, the user convenience can be enhanced and various new combined functions can be provided.

As described above, the mobile apparatus 100 may be implemented with various types of devices such as portable phone, tablet PC, laptop PC, PDA, MP3 player, electronic frame device, TV, PC, kiosk, and so on. Thus, the configuration illustrated in FIGS. 3 and 4 may be modified in a variety of ways according to the type of the mobile apparatus 100.

As described above, the mobile apparatus 100 may be implemented as various forms and configurations. The controller 130 of the mobile apparatus 100 may provide various functions according to the implementation. The various functions will be described below by referring to FIGS. 6 to 15.

Figure 5:
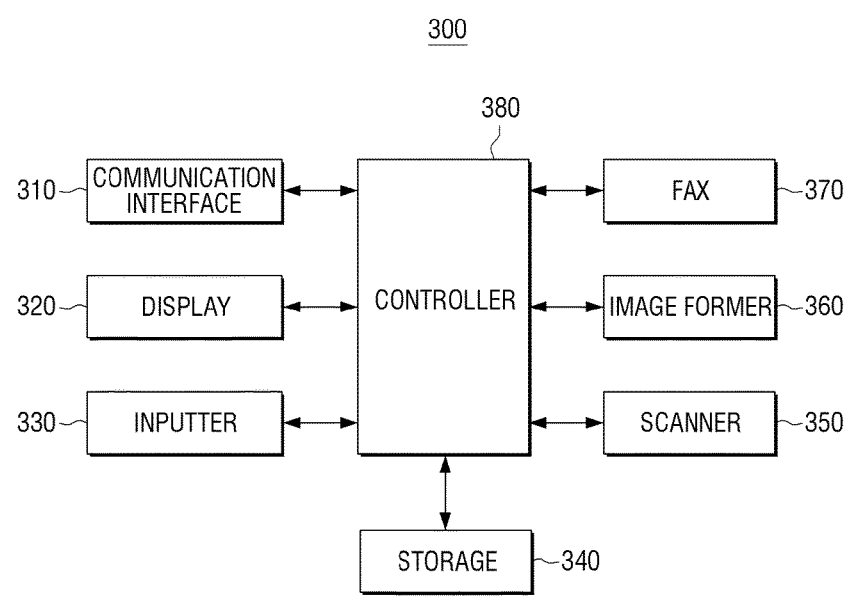
FIG. 5 is a block diagram of the image scan apparatus in FIG. 1.

FIG. 5 is a block diagram of the image scan apparatus in FIG. 1.

Referring to FIG. 5, the image scan apparatus 300 may include a communication interface 310, a display 320, an inputter 330, storage 340, a scanner 350, an image former 360, a fax 370, and a controller 380.

The communication interface 310 may be formed to connect the image scan apparatus 300 to an external device via, for example, a LAN and/or the internet network. The connection may also be made through a USB port or a wireless module. The wireless module may support, for example, WiFi, WiFi Direct, NFC, Bluetooth, and so on.

The communication interface 310 may receive a job execute request from the mobile apparatus 100. A job execute request may be an open API command that can be perceived by the image scan apparatus. The communication interface 310 may perform communication with the mobile apparatus 100 by using, for example, a unified protocol (to be explained below with reference to FIGS. 6 & 7).

The communication interface 310 may transmit the scan image generated at the scanner 350, which will be described below, to the mobile apparatus 100, or stream a plurality of image data that makes up the whole scan image to the mobile apparatus 100.

It has been explained that the scan image or a plurality of the image data generated at the scanner 350 may be transmitted to the mobile apparatus 100 that sent a scan command. However, when a job execute request of a user is scan-to-FTP or scan-to-email, the communication interface 310 may transmit the generated scan image to an FTP address or an email address corresponding to the job execute request.

The communication interface 310 may receive printing data from the mobile apparatus 100, or transmit a document file or address book information previously stored in the storage 340 to the mobile apparatus 100. The print file may be data in the printer language such as PS or PCL, or may be files such as PDF, XPS, BMP, JPG, and so on.

The display 320 may display various pieces of information supported by the image scan apparatus 300. The display 320 may be a monitor type such as LCD, CRT, and so on, or a touch screen that can simultaneously perform the functions of the inputter 330.

The display 320 may display a screen with options to control the functions of the image scan apparatus.

The inputter 330 may include a plurality of function keys with which a user can establish or select the various functions supported by the image scan apparatus 300. The inputter 330 may be implemented as a mouse or a keyboard. The inputter 330 may also be implemented as a touch screen that can also perform the function of the display 320 as described above.

The storage 340 may store the print file. Specifically, the storage 340 may store the print file received through the communication interface 310. The storage 340 may store a scan image generated by the scanner 350. This will be described below.

The storage 340 may also store address book information. The storage 340 may be implemented within the image scan apparatus 300 or external storing medium, e.g., a removable disk including USB memory, a web server through the network, and so on.

Thus, a user may connect USB memory to the image scan apparatus 300, receive and edit the document file stored in USB memory connected to the image scan apparatus 300 on the mobile apparatus 100, transmit the edited file back to the image scan apparatus 300, and perform the print job. Thus, even when the image scan apparatus 300 does not support the editing function regarding the document file, the editing function may be performed in combination with the mobile apparatus 100.

The scanner 350 may generate a scan image by scanning the source material. Specifically, when a job execute request of a user is a copy command, a scan command, or a fax transmit command, the scanner 350 may generate the scan image by scanning the source material. When a job execute request of a user is a scan command, the scanner 350 may deliver the generated scan image to the communication interface 310 so that the generated scan image is stored in a preset storage area. When a job execute request is a copy command, the scanner 350 may deliver the generated scan image to the image former 360 so that the generated scan image is printed. When a job execute request of a user is fax transmit command, the scanner 350 may deliver the generated scan image to the fax 370 so that the generated scan image is faxed.

The scanner 350 may be flatbed form or auto supply device form. Further, the scanner 350 may be provided with a scan buffer that temporarily stores the image data generated at the optical source module.

When the image scan apparatus 300 is not provided with a storage device such as a hard disk drive (HDD), or when the storing capacity of storage of the image scan apparatus 300 is less than a preset storing capacity, the scanner 350 may stop scanning operation whenever the image data fills the scan buffer. The image data may then be transmitted to the mobile apparatus 100 through the communication interface 310. This operation will be described below in detail by referring to FIG. 6.

The image former 360 may perform an image forming function. Specifically, the image former 360 may print the print file received through the communication interface 310 and print the scan image generated at the scanner 350.

The fax 370 may fax-transmit the scan image. Specifically, when a job execute request of a user is a fax transmit command, the fax 370 may fax-transmit the scan image generated at the scanner 350 to the inputted fax address.

The controller 380 may control each unit within the image scan apparatus 300. Specifically, when a job execute request is received through the communication interface 310, the controller 380 may control each unit in the image scan apparatus 300 so that the function is performed according to the received job execute request. For example, when a scan command is received from the mobile apparatus 100, the controller 380 may control the scanner 350 to scan the source material, and control the communication interface 310 to transmit the scan image as a result of the scanning to the mobile apparatus 100.

When the image scan apparatus 300 does not include enough storage area to store the entire scan image (e.g., when HDD is not provided or when HDD capacity is less than a preset value), and when the image data generated at the scanning fills the scan buffer, the controller 380 may stop the scanning operation and control the communication interface 310 to transmit the image data stored in the scan buffer to the mobile apparatus 100, control the scanner 350 to re-start the scanning operation when the scan buffer is empty, and control the scanner 350 and the communication interface 310 to generate the image data for all of the source material by repeating the above processes.

When position information and/or time information are received from the mobile apparatus 100, the controller 380 may generate the scan image using the received position information and/or time information.

The image scan apparatus 300 according to an embodiment may interoperate with the mobile apparatus 100. Thus, expanded functions in addition to basic functions may be provided to a user. Accordingly, a scan job may be easily performed even if the image scan apparatus 300 has limited storage resources.

Although it has been described that the image scan apparatus 300 includes all three of the image former 360, the scanner 350 and the fax 370, the image scan apparatus 300 may be implemented to include one or two of the scanner 350, the image former 360, and the fax 370.

Figure 6:
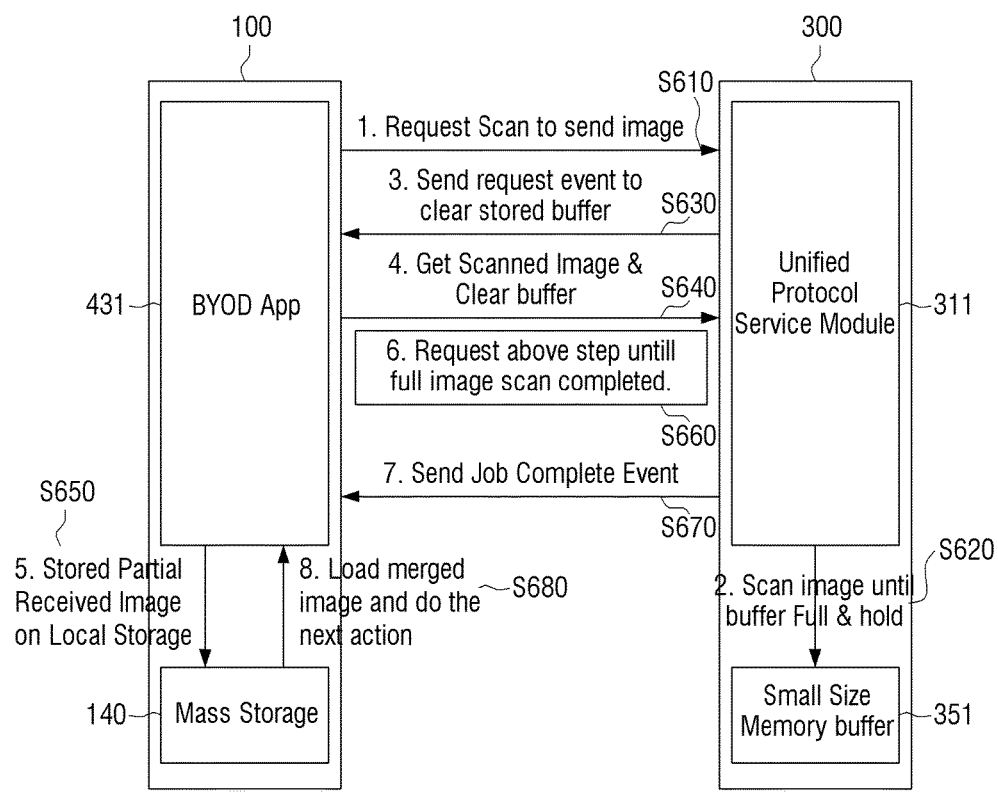
FIG. 6 is a diagram provided to explain operation of unified protocol according to an embodiment.

FIG. 6 is a diagram provided to explain operation of the unified protocol according to an embodiment.

Referring to FIG. 6, in response to a scan command of a user the BYOD application 431 installed on the mobile apparatus 100 may transmit a scan command at S610 to the unified protocol service module (UP) 311 through open API provided for controlling the image scan apparatus 300.

According to an embodiment, a unified protocol may be used instead of the related network protocol such as SMB/FTP. Thus, controlling can be performed under the minimum allowance condition for the open API using environment without having security issue such as port allowance on the network that can be a problem in using another protocol such as SMB/FTP. Further, a user may only install the BYOD application on the mobile apparatus, and the using environment setting for SMB/FTP may not be requested.

The image scan apparatus 300 receiving the scan command may perform a scan job at S620 by using the scan buffer 351.

At S630, the image scan apparatus 300 may stop the scanning operation when the scan buffer 351 is filled with the image data, and transmit the image data stored in the scan buffer to the mobile apparatus 100.

The mobile apparatus 100 receiving the image data may store the received image data in the storage 140 at S650 and transmit a command to the image scan apparatus 300 at S640 to empty the scan buffer and continue the scanning operation.

At S660, the above processes may be repeatedly performed until the final image data for the source material is generated. When the final image data is generated and transmitted by iteration of the above processes, the image scan apparatus 300 may inform the mobile apparatus 100 that the scan job is completed at S670. At S680 the mobile apparatus 100 may generate the scan image by using the plurality of the image data stored in the storage 140.

The BYOD application 431 may obtain a scan image without a need for mass storage device in the image scan apparatus 300, because the image being scanned can be sent to the mobile apparatus 100 a strip at a time as the scan buffer of the image scan apparatus 300 fills up.

Flow control may be necessary to implement the above operation so that after scanning a portion of the image to full capacity of the scan buffer, the scanner and the image processing module can stop until the image data in the scan buffer is transmitted, and then resume scanning after the BYOD application 431 receives the image data and notifies the image scan apparatus 300 that the image data has been received. This operation will be specifically described below by referring to FIG. 7.

Figure 7:
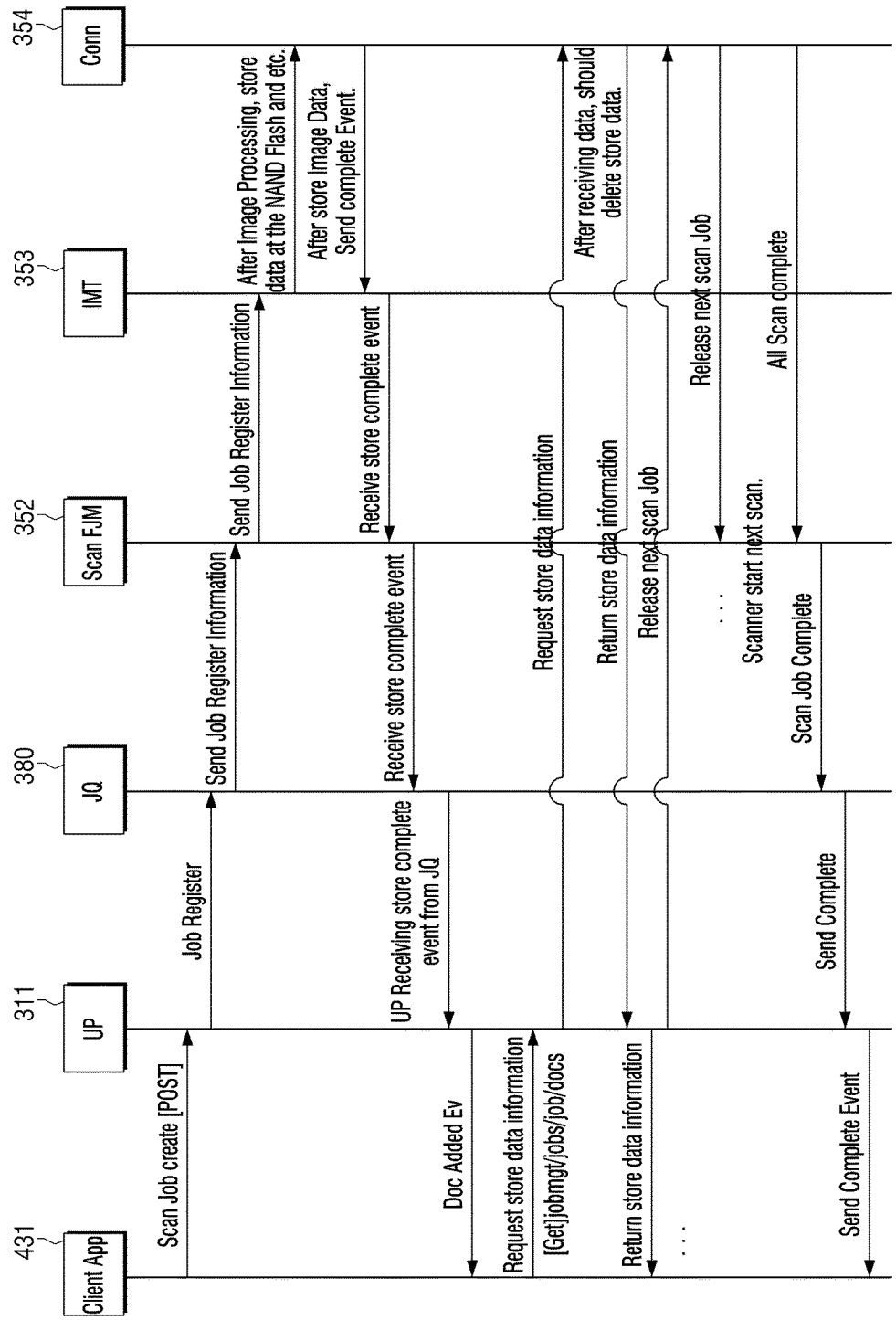
FIG. 7 is a sequence diagram provided to specifically explain the operation in FIG. 6.

FIG. 7 is a sequence diagram provided to more specifically explain the operation of FIG. 6.

Referring to FIG. 7, the BYOD application 431 may perform the scan job create command through the unified protocol in order to retrieve the scan image data from the image scan apparatus 300.

The unified protocol service module (UP) 311 of the image scan apparatus 300 receiving the above command may deliver the scan command from the BYOD application 431 to the JQ module 385, which controls the image scan apparatus 300.

The JQ module 385 may deliver the scan command to a scan module (scan FJM) 352 managing the scanning, an image processing module (IMT) 353, and a connector module (Conn) 354 to be able to transmit the generated image.

The scan module 352 receiving the above command may deliver the image data, which is raw data of the scan image, to the image processing module 353 in real time. The image processing module 353 may convert the raw image into a standardized image format such as JPEG, TIFF, PDF, and the like that may be designated by a user and supported by various applications.

The generated scanning raw data may be of relatively great size. If a mass storage device is not used, it will take a considerable memory amount to at least store a part of entire document, not to mention the entire images. Thus, the scan module 352 without a mass storage device, or with a limited mass storage device, may generate the raw data and store the generated image on the scan buffer while the images are converted in the image processing module 353. If the internal scan buffer is full, the scanning and image conversion may be stopped when the scan buffer is full. Depending on the size of the scan buffer, the image scanned may be a part of a page, or a page or more.

While the scanning operation is stopped, the UP 311 may transmit Doc Added Event informing the BYOD application 431 that the images are ready for retrieval.

The BYOD application 431 receiving Doc Added Event may request the image information regarding the job that is currently being processed in the UP 311 (Jobmgt/GetJobs/job/docs), and the UP 311 may transmit a part of the image data currently stored in the scan buffer in response to the request, clear the scan buffer, and re-start the scanning operation that the scan module 352 stopped previously.

Thereafter, the above processes may be repeated until all the scanning data are generated. When there are no more images to be generated, Complete Event may be transmitted to the BYOD application 431 by the UP 311.

The BYOD application 431 receiving Complete Event has to retrieve the partial image generated up to now according to the event which is replied through UP 311 of the image scan apparatus 300, and generate the last file images based on the file information contained in the header of the file after finally combining the obtained files.

Further, according to needs, the BYOD application 431 may provide an additional expansion function by using the generated scan images. An expansion function may allow two or more devices such as the mobile apparatus 100 and the image scan apparatus 300 to perform a job where each device performs a part of the job.

Figure 8:
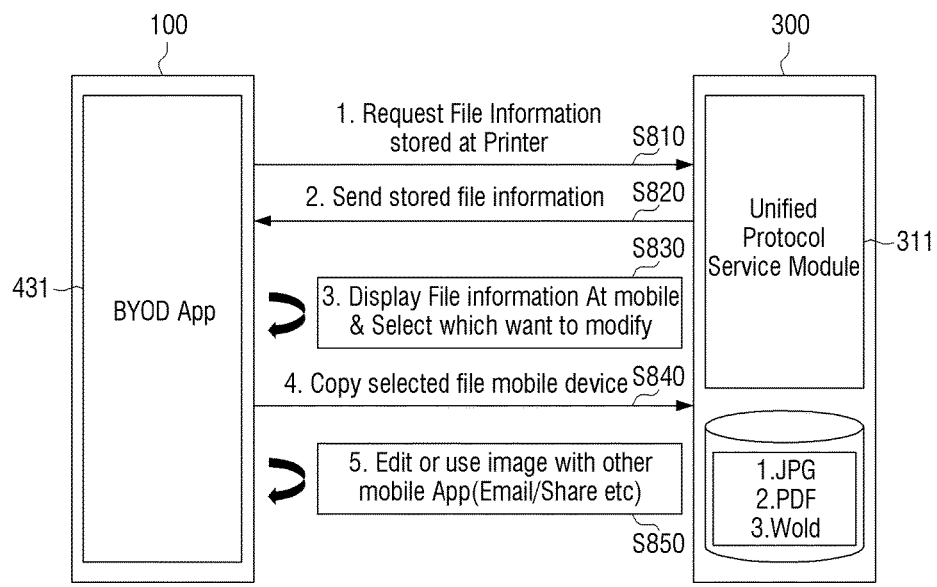
FIG. 8 is a diagram provided to explain a method for editing documents according to an embodiment.

FIG. 8 is a diagram provided to explain a method for editing documents according to an embodiment.

When the UP 311 is provided, the data information or the document files within the image scan apparatus as well as scan images generated at the image scan apparatus may be transmitted and received by using the UP 311.

At S810, the mobile apparatus 100 may request transmission of the document file previously stored in the image scan apparatus 300.

At S820, the image scan apparatus 300 receiving the transmission request may transmit the necessary document file to the mobile apparatus 100.

At S830, the mobile apparatus 100 receiving the document file may edit the document file by using the document edit application that was previously installed. At S840, the mobile apparatus 100 may transmit the edited document file to the image scan apparatus 300 to perform the print job, and may perform another job such as email transmission, at S850.

Recently, many image forming (or image scan) products having mass storage devices have been introduced. These products may be used to store images scanned by them or images generated externally, and later outputting the images, or transmitting the images by interoperating with the fax/send functions, and so on, of a printing device.

Furthermore, some image forming products may provide the function of editing the stored images, although a large-scale GUI display may be needed for such implementations. The image forming apparatus that provides small size GUI or text UI may not be able to edit the stored images.

Even when a GUI of an image forming apparatus provides an image view or the editing function, it may be difficult to provide functions that are comparable to the familiar image view or editor function available to a user on, for example, his mobile apparatus 100. In order to solve the problem, a user may search and select the document files stored in the image scan apparatus with the BYOD application 431 installed in the mobile apparatus 100, retrieve the desired file onto the mobile apparatus 100, and use the tools on the mobile apparatus for editing. Thus, a user can perform various functions by utilizing a familiar application on the mobile apparatus 100.

In addition to user convenience, the above embodiment may provide various modifications into additional forms. For example, when storing common documents such as Word/PowerPoint/Excel files in addition to image files such as JPEG and PDF files, the image scan apparatus may not directly provide the printing function for such commercial application documents. In this case, a user may retrieve the desired file to the mobile apparatus 100, convert it into the available data format by using a printer driver for the file from the mobile apparatus 100, and transmit the converted file to the image forming apparatus (or image scan apparatus). Accordingly, a file that could not be printed previously can be printed by using the BYOD application 431 with the image forming apparatus (or image scan apparatus).

The mass storage device for the image forming apparatus (or image scan apparatus) may be a removable device such as USB memory or stick memory in addition to stationary device fixed within the image scan apparatus.

In this case, the image forming apparatus (or image scan apparatus) that does not support a mass storage device and limits file format that can be printed, USB memory stick may be connected and the BYOD application 431 may be used. Accordingly, preview/edit/print/reading functions can be expanded beyond the file types that are supported by the printer.

Figure 9:
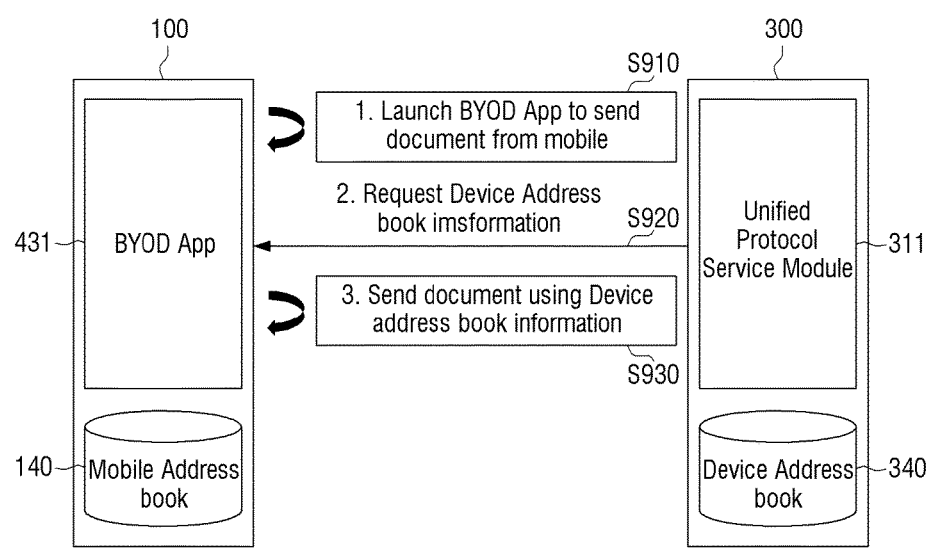
FIGS. 9 to 11 are diagrams provided to explain a method for sharing an address book according to an embodiment.
Figure 10:
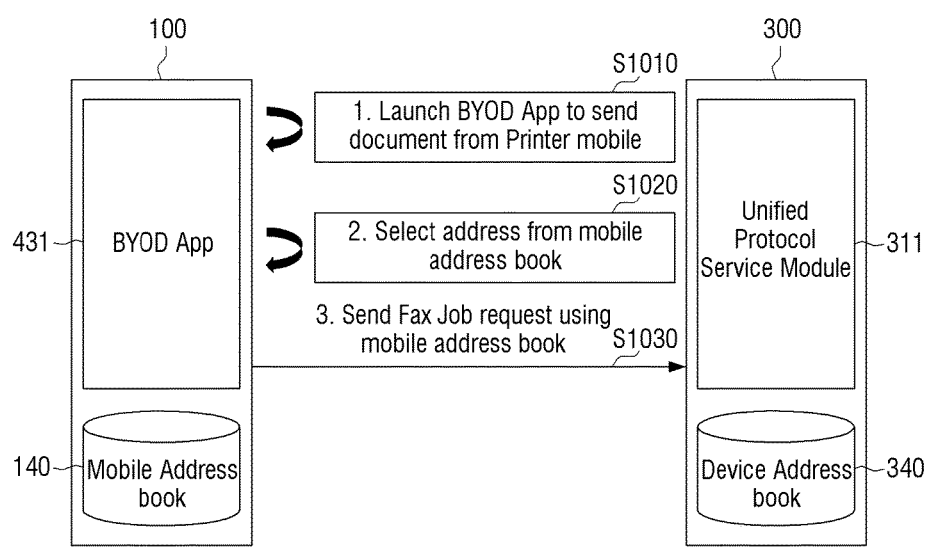
Figure 11:
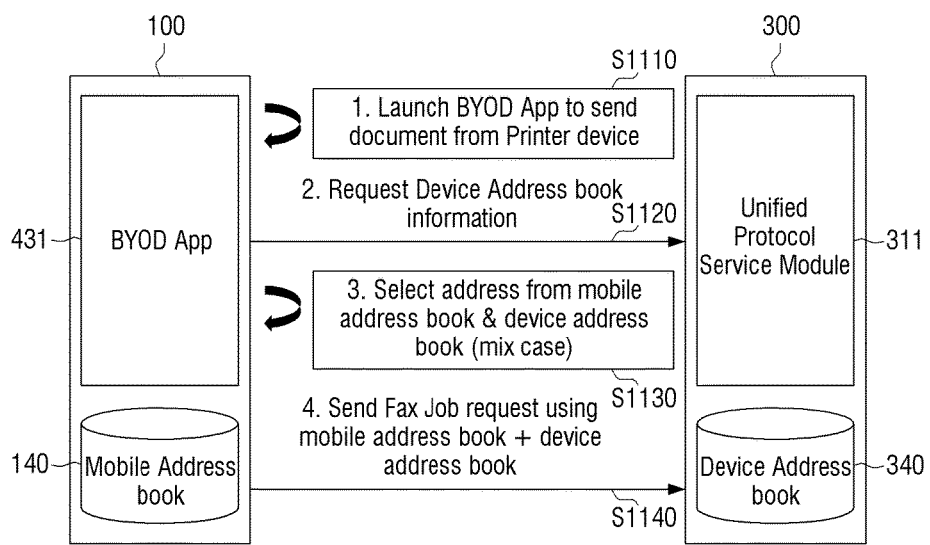

FIGS. 9 to 11 are diagrams provided to explain a method for sharing an address book according to an embodiment.

Specifically, FIG. 9 is a diagram provided to explain an embodiment of sharing address book information stored in the image scan apparatus.

When the image scan apparatus 300 is used for common office jobs, the image scan apparatus 300 may have various addresses in an address book. The addresses may be email addresses, server addresses, etc. In this case, a user may use the BYOD application 431 to request sharing of address book information stored in storage 340 of the image scan apparatus 300. Accordingly, the BYOD application 431 may send a request for the address book to the UP 311 at S910 and obtain the address book at S920.

A user may perform transmission of the data or the file previously stored by using the received address book at S930. Thus, a user may retrieve the address book information by contacting the image scan apparatus 300 without a need to separately store the addresses related with the jobs, and transmit the images from his mobile address to another email/server by using the address book information.

FIG. 10 is a diagram provided to explain an embodiment using the address book information stored in the mobile apparatus.

For example, when a user needs to transmit fax data, a user may perform the transmission function in an MFP with a faxing function because he cannot fax-transmit with the mobile apparatus. In this case, when a user fax-transmits by utilizing the address book information stored in the mobile apparatus 100, he may easily perform the fax-transmitting with his address list on the mobile apparatus 100 without having to separately register the address on the address book of MFP.

For the above, a user executes the BYOD application 431 at S1010, selects the address provided from his mobile apparatus 100 at S1020. The BYOD application 431 sends a job execute request to the UP 311 of the image scan apparatus 300 along with the selected address information. The image scan apparatus 300 may then transmit a fax to the selected address.

FIG. 11 is a diagram provided to explain an embodiment of combining and using the address book in the mobile apparatus and the image scan apparatus.

Various embodiments may be applicable to both when the mobile apparatus 100 is a sender and when the image scan apparatus 300 is a sender. Specifically, the BYOD application 431 may be executed at S1110, and the address book information of the image scan apparatus 300 may be requested and retrieved at S1120.

At S1130, UI of the BYOD application 431 may provide a function that enables both address books to be selected. Based on the combined address book information, the mobile apparatus 100 may directly transmit, or a command may be sent to the image scan apparatus 300 to transmit at S1140.

Figure 12:
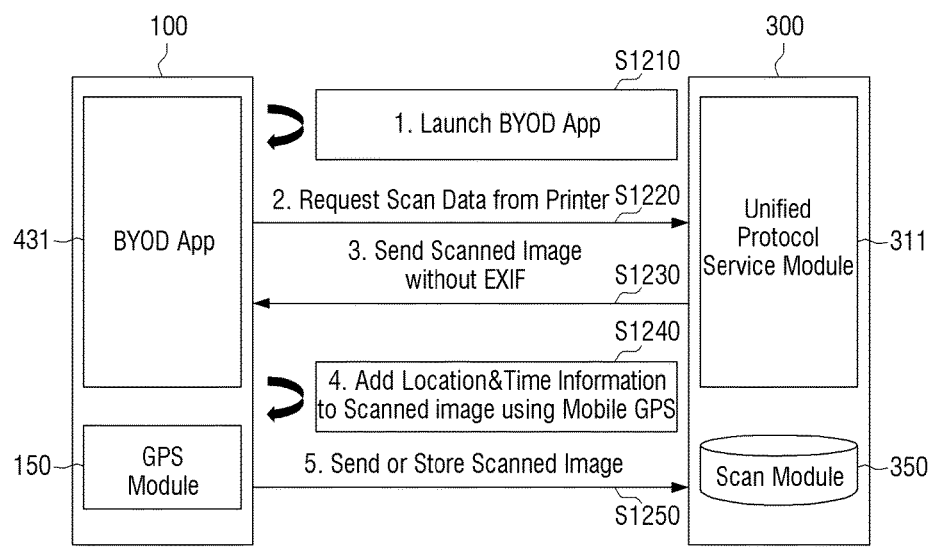
FIG. 12 is a diagram provided to explain EXIF insert operation according to an embodiment.

FIG. 12 is a diagram provided to explain operation of exchangeable image file format (EXIF) inserting according to an embodiment.

EXIF is technology which inserts device/image form/position information/time information regarding the photographing of the corresponding picture into the image generated by a digital camera. EXIF may be expanded and implemented by using GPS function included in the portable phone and interoperating with the scanning function of the image scan apparatus 300.

A user may execute the BYOD application 431 at S1210, and the BYOD application 431 may request a scan function to the image scan apparatus 300 at S1220. Accordingly, the image scan apparatus 300 may deliver the image data generated through the scanning module to the BYOD application 431 of the mobile apparatus at S1230.

The BYOD application 431 may insert a position information retrieved from the GPS of the mobile apparatus 100 using EXIF into the received scan image at S1240. Accordingly, the scan image may be stored and used in the mobile apparatus 100, and simultaneously transmitted by the mobile apparatus to the image scan apparatus 300 at S1250. In this case, there may be an advantage in that the position information may be additionally added, which may not be done when the image scan apparatus 300 alone performs scanning and transmits a result to the desired destination.

In various implementations, the mobile apparatus may transmit only the position information to the image scan apparatus, and the image scan apparatus may add EXIF information when generating the image of the scanning module based on the position information.

Furthermore, in various implementations, the image scan apparatus may scan the image and store the image in an internal memory or an external memory such as USB Host. Specifically, when the scan-to-USB function is performed by using UI of the image scan apparatus 300, rather than simply storing the image only, the position information may be received from the mobile apparatus 100, and the position information may be reflected into the scan image stored in USB based on the received position information.

Figure 13:
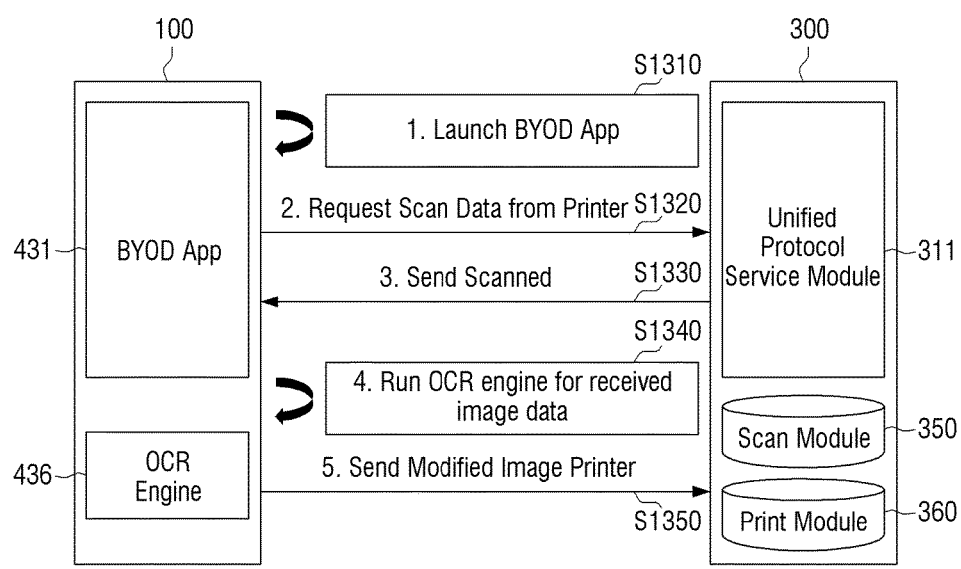
FIGS. 13 and 14 are diagrams provided to explain OCR operation.
Figure 14:
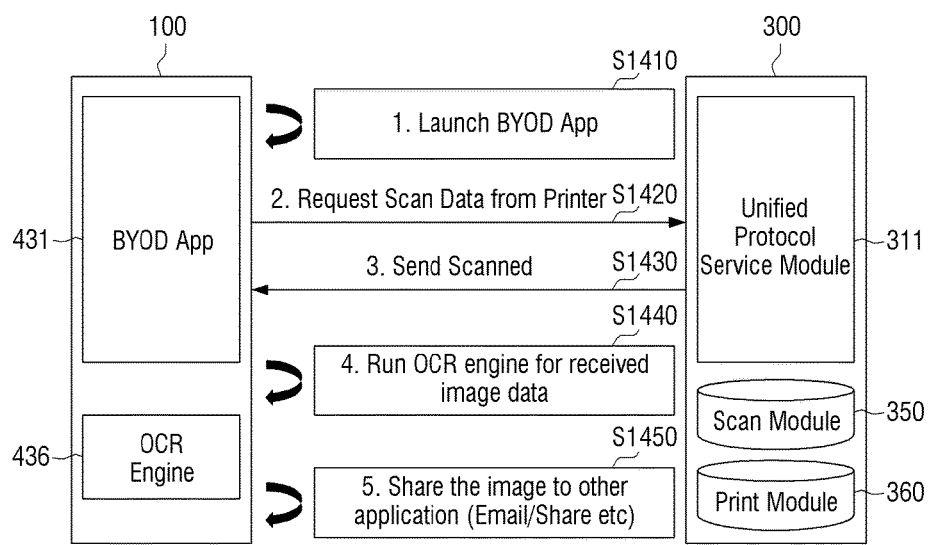

FIGS. 13 and 14 are diagrams provided to explain OCR operation.

The OCR technology involves extracting characters from an image document. Based on OCR technology, only desired part may be extracted from the document, or the image part and the character part may be extracted from the whole document, and utilized for various purposes based on the recognized characters, such as, translation into the desired language, and so on.

Specifically, FIG. 13 is a diagram provided to explain an embodiment in which the mobile apparatus 100 edits the image and transmits the edited image back down to the image scan apparatus 300 for processing to, for example, output the document written in English to one written in Korean.

Referring to FIG. 13, a user may execute the BYOD application 431 at S1310, the BYOD application 431 may request the scanning of the current image to the image scan apparatus at S1320, and retrieve the corresponding image to the mobile apparatus 100 at S1330.

The mobile apparatus 100 may extract the English characters through an OCR engine 436, perform the translation, and perform the editing in order to modify the character area into Korean language at S1340. The mobile apparatus 100 may then transmit a command to print the edited image at S1350.

FIG. 14 is a diagram provided to explain an embodiment of processing the modified image in the mobile apparatus through the application of the mobile apparatus.

For example, when the image scan apparatus includes no function for generating and transmitting searchable PDF, a user may execute the BYOD application 431 at S1410, and input a scan command on the BYOD application 431. The BYOD application 431 receiving the scan command may transmit the scan command to the image scan apparatus 300 at S1420, and receive the scan image in response to the scan command at S1430.

The BYOD application 431 receiving the scan image may extract the characters in the scan image through OCR engine 436, and generate a searchable PDF file by using the extracted characters at S1440. The generated searchable PDF file may be stored in the mobile apparatus 100 and used in various forms at S1450.

Figure 15:
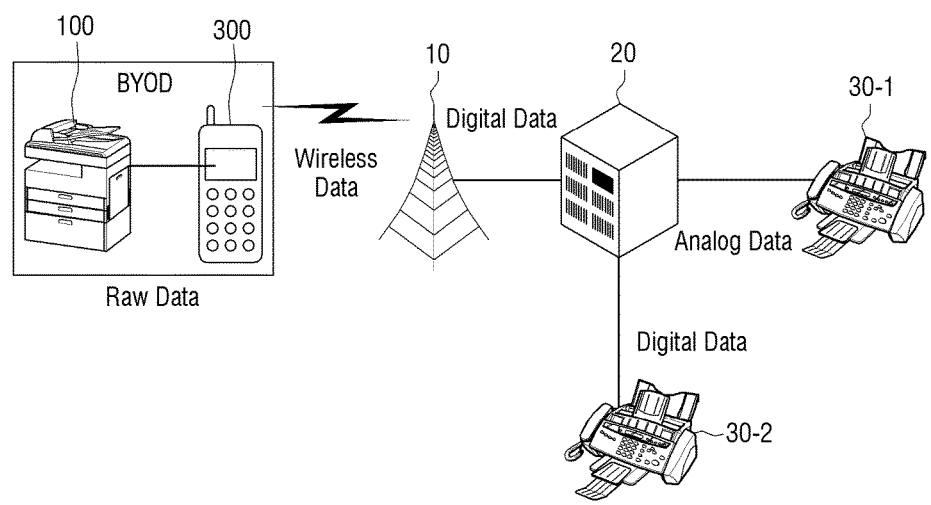
FIG. 15 is diagram provided to explain fax operation according to an embodiment.

FIG. 15 is a diagram provided to explain the fax operation according to an embodiment.

Referring to FIG. 15, when it is desired to transmit fax by using the mobile apparatus 100 that can convert digital signal into voice signal, the scan image scanned in the image scan apparatus 300 that does not support faxing may be transmitted to the mobile apparatus 100 that includes the BYOD application 431.

The mobile apparatus 100 may convert the raw data into T4 format used in fax transmission, call the corresponding fax number, transmit the fax protocol corresponding to the received fax protocol, and transmit the converted signal in fax format. This signal may be converted into analog fax signal and transmitted to another facsimile 30-1, 30-2 through a station 10 or a service provider 20 (or fax server).

When the receiving device is an MFP supporting the internet fax protocol, the fax data may be transmitted immediately through the network to the receiving device. Accordingly, the fax may be transmitted to the MFP that does not support the traditional fax over a telephone line.

FIGS. 16 to 32 are diagrams illustrating various embodiments regarding the user interface window displayed on the mobile apparatus in FIG. 1.

Three areas between the mobile apparatus and the printer device should be considered in order to share resources between an image scan apparatus and a mobile apparatus and provide the expansion function: discovery stage in which printer devices that can be supported by the mobile apparatus are found; pairing stage in which a printer device is selected and connected to the mobile apparatus; and event processing stage in which the desired event is completed.

Figure 16:
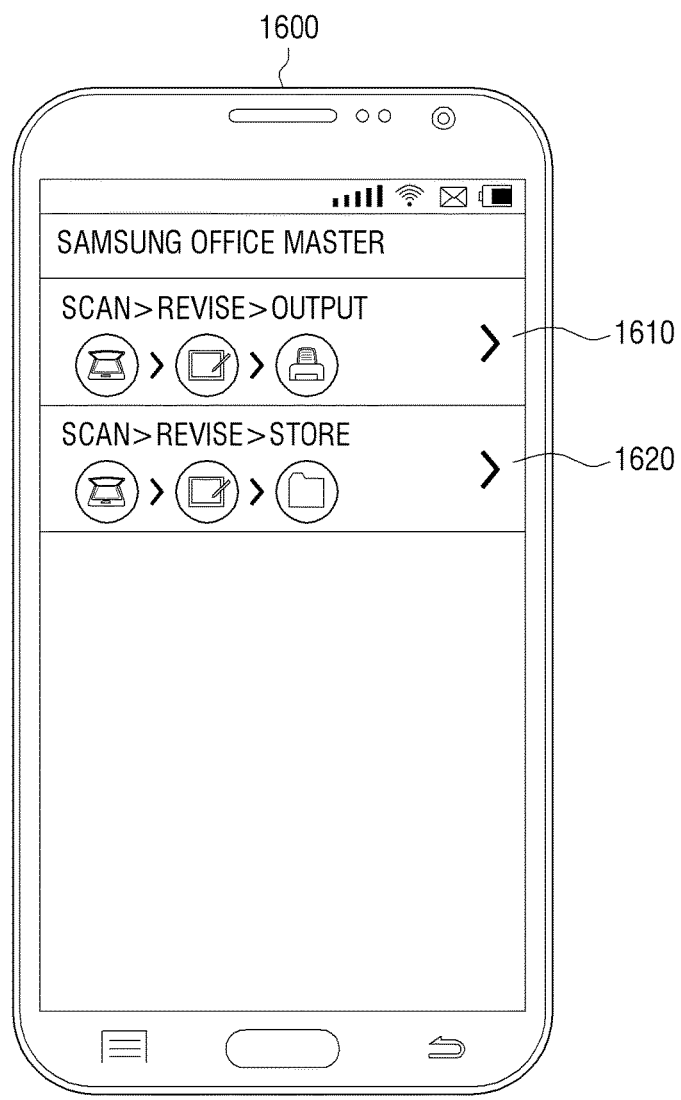
FIGS. 16 to 32 are diagrams illustrating various examples regarding user interface window displayed on the mobile apparatus of FIG. 1.
Figure 17:
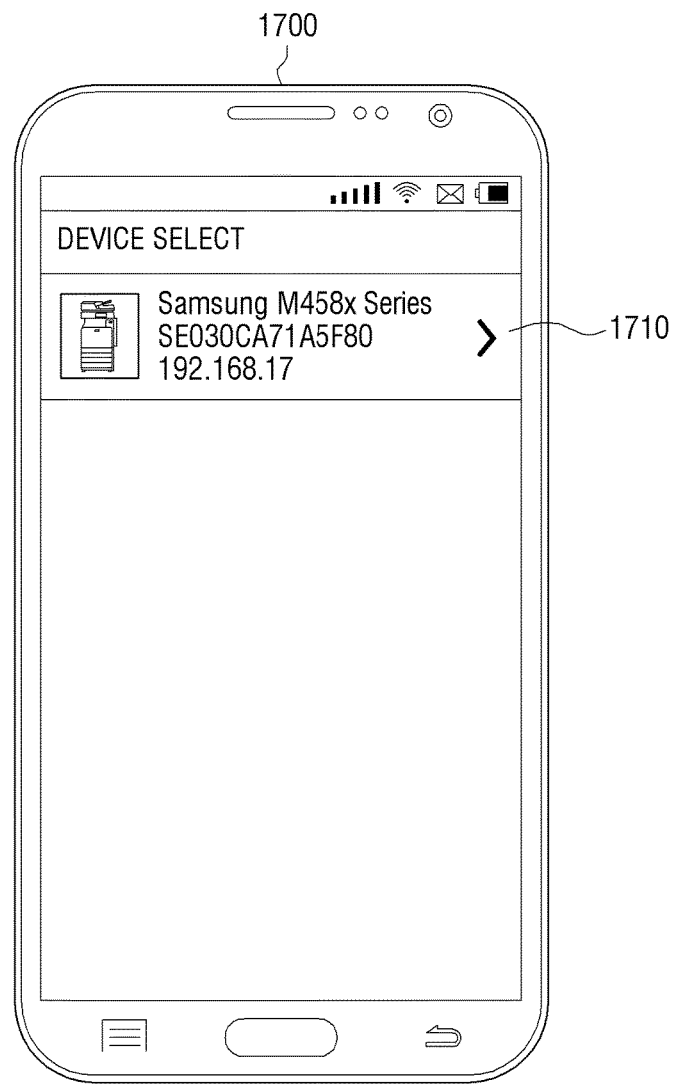
Figure 18:
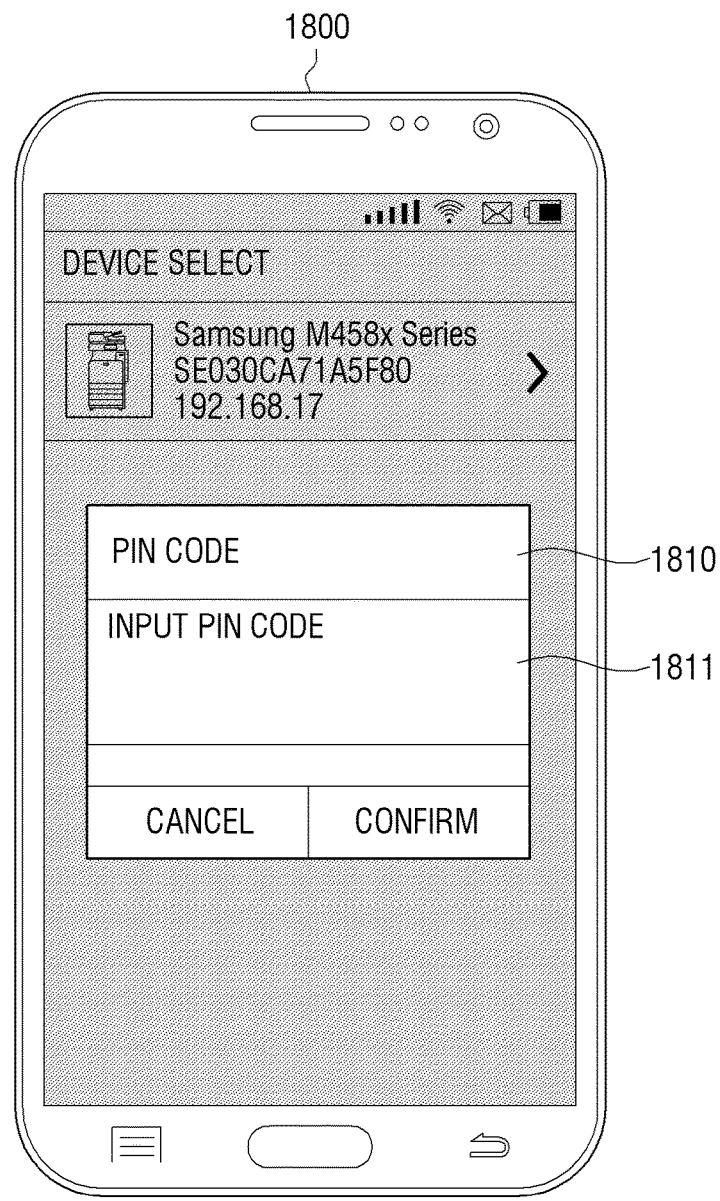

FIGS. 16 to 18 are diagrams provided to explain a process of registering the image scan apparatus 300 or image forming apparatus on the BYOD application 431 so that the mobile apparatus 100 and the image scan apparatus 300 (or image forming apparatus) share resources and provide the expansion function. The above described discovery, pairing and event registering may be performed in this process.

Referring to FIG. 16, when a user executes the BYOD application 431, the user interface window 1600 may provide the job workflow 1610 previously defined by a user in a list form.

When a user select one of the displayed job workflow, the device select screen may be displayed as illustrated in FIG. 17. Herein, the BYOD application 431 may perform the discovery described above.

Referring to FIG. 17, the user interface window 1700 may search and display the device list 1710 of the image scan apparatuses or the image forming apparatuses confirmed on the uniform network that can connect to the BYOD application 431.

The BYOD application 431 may search for devices by using protocols such as SNMP and mDNS, determine whether each device found supports the BYOD application based on MIB information provided by the device, and display the devices that support the BYOD application and can be connected.

When a user selects a device found through discovery, the BYOD application 431 may confirm the connecting state with the selected device, which may be, for example, the image scan apparatus 300. When a user selects the image scan apparatus 300 to connect to the mobile apparatus 100, the user interface window of FIG. 18 may be displayed.

Figure 19:
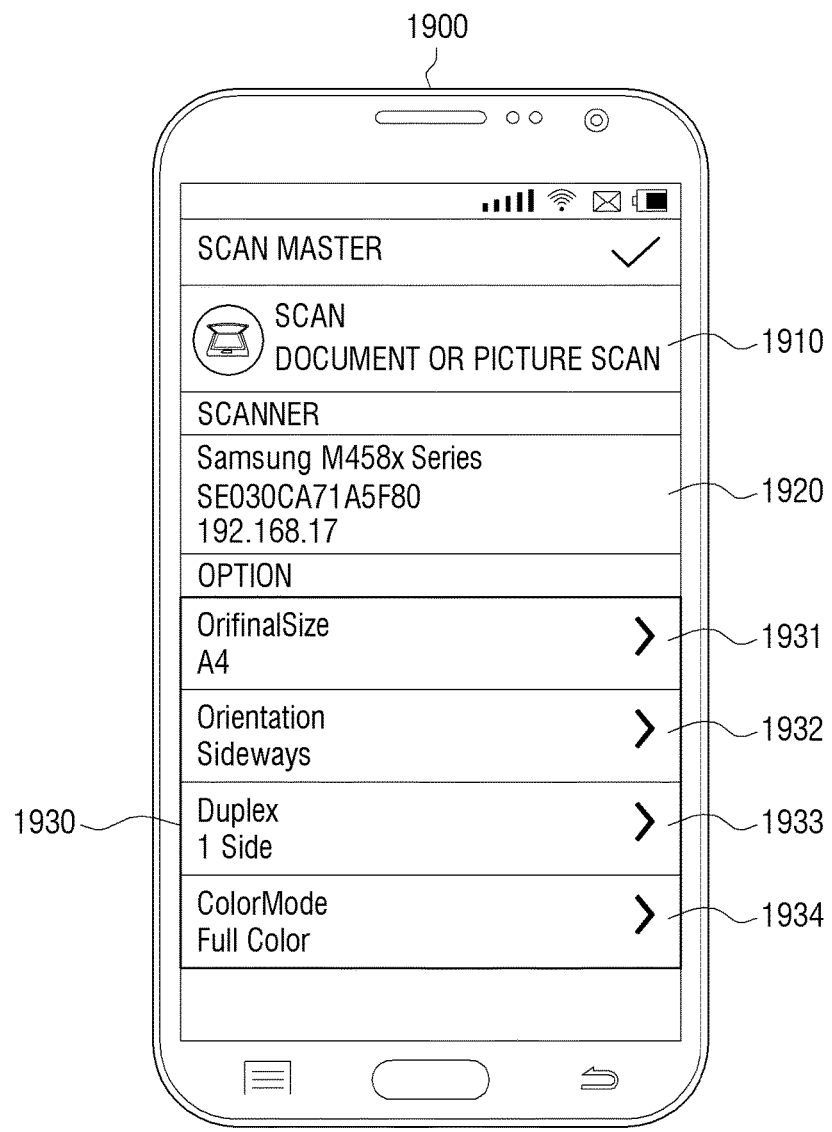

When the image scan apparatus 300 is connected, the user interface window of FIG. 19 may be displayed.

Referring to FIG. 18, the user interface window 1800 may provide the pin code input screen 1810 to a user. After receiving input of a pin code 1811 from a user, pairing with the image scan apparatus 300 may be performed securely. The BYOD application 431 may store the connecting information so that the connection may be performed without inputting another pin code when the image scan apparatus 300 is selected again.

When the connection is completed through pairing, the BYOD application 431 may retrieve information of the image scan apparatus 300 from the connected image scan apparatus 300 through the UP 311. Otherwise, the BYOD application may obtain the authority to control a job, register the necessary types of the events for the image scan apparatus 300, and transmit the state information regarding the job performed by the BYOD application and other state information such as device errors as events through the event processing described above.

FIG. 19 illustrates an example of the start screen that lists various expansion functions available after the scan>revise>output workflow is selected.

When a user selects a device to perform the workflow and when the pairing with the corresponding device is completed, the BYOD application 431 may obtain various scan related capability information supported by the device connected through UP 311, and display the user interface window based on the obtained information.

Specifically, the user interface window 1900 includes job display area 1910 for information on the job to be done, device display area 1920, and option select area 1930 that lists various options that can be selected by a user.

The job display area 1910 displays the operation of the job constituting the workflow selected by a user. The specific information displayed may vary with different embodiments. For example, while FIG. 19 shows information for a scan job, when the workflow selected by a user includes a printing function, information regarding the printing function may be displayed. The option select area 1930 may display a list of printing options that can be selected.

The device display area 1920 displays information of the image scan apparatus or the image forming apparatus selected by a user.

The option select area 1930 is displayed so that a user can specify options for the job to be done. As illustrated for this specific embodiment, the source material size 1931, the source material direction 1932, the duplex scan 1933 and the color mode 1934 may be included as options that can be selected. The option select area may be modified and displayed according to the performance of the image scan apparatus selected by a user.

FIGS. 20 to 23 are diagrams illustrating an example of the user interface windows that can be displayed when a user selects the scan option and the scanning operation is performed.

When a scan command is inputted by a user, the BYOD application 431 may transmit [POST]/ws/v1/scanner/scanjobfactory/createjob command including the scan option established by a user, the file storing position and the file name to the connected image scan apparatus 300 through the UP 311.

The image scan apparatus 300 receiving the scan command may perform the scanning according to the command, and deliver the job processing state to the BYOD application 431 requesting the job with the web socket method as following job state modifying event in Jason format.

"JobStatusChangedEv":{"resourceId":90,"added": [{"category":"jscJobConfirmation," "severity":"sInfo," "specificCondition":"jcWaitingForNextSegment," "data":{ }}],"removed":[ ]}}}

Figure 20:
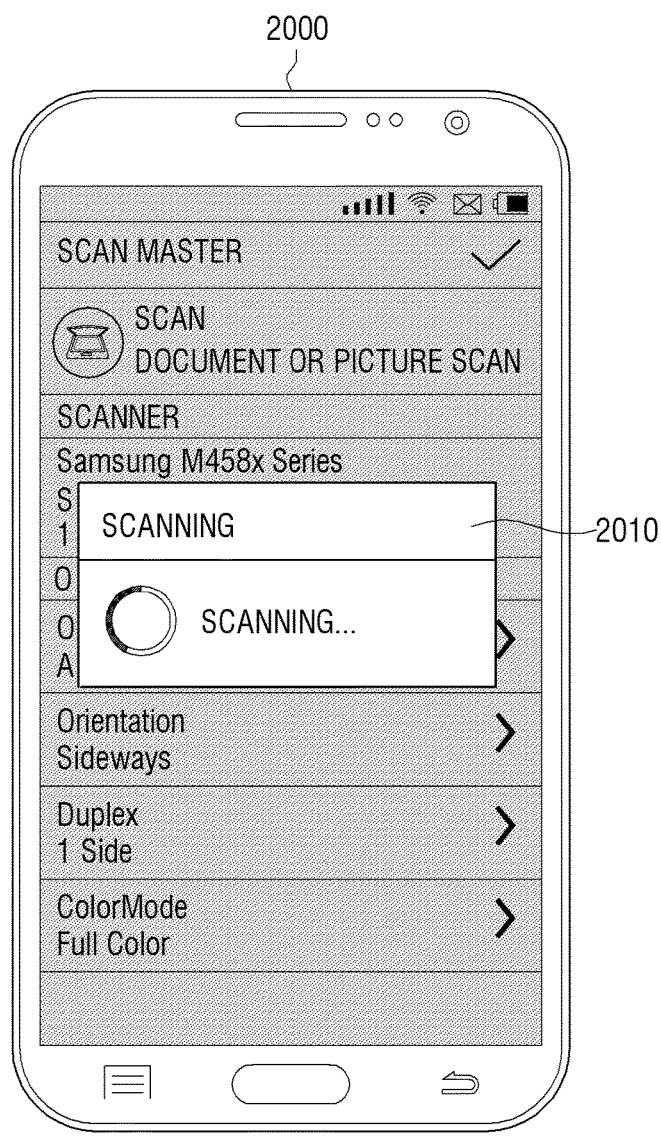

When the above event is received, the BYOD application 431 may display the user interface window of FIG. 20. Referring to FIG. 20, the user interface window 2000 includes the area 2010 that informs that the scan job is currently ongoing.

Figure 21:
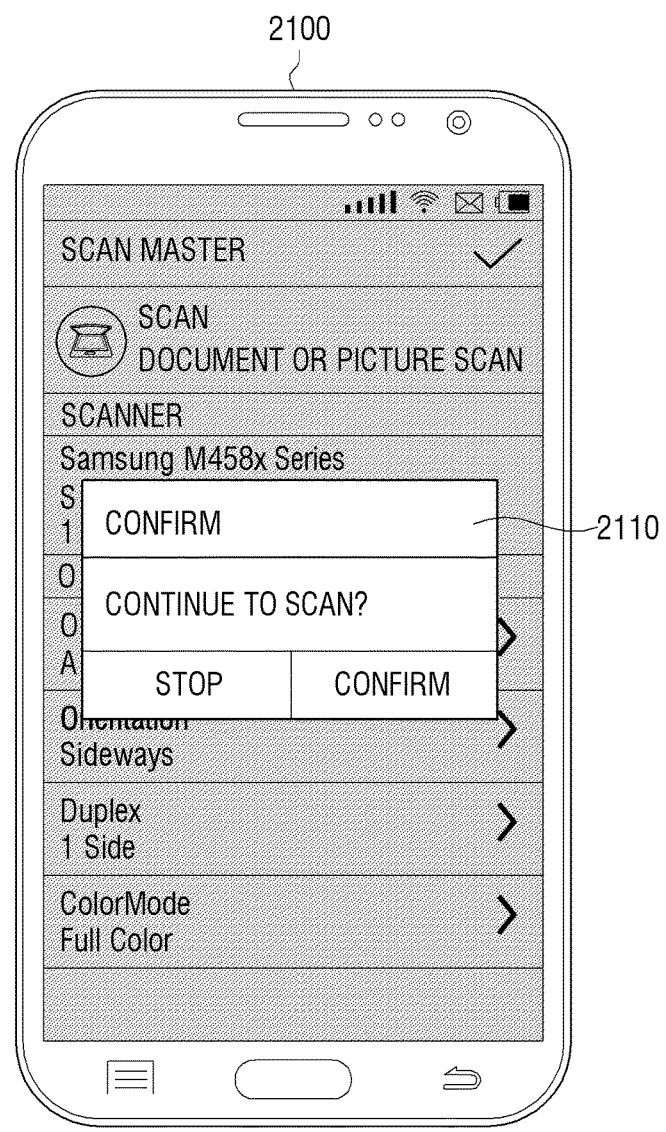

"jcWaitingForNextSegment" is an event command that indicates whether there is another page to be scanned. For example, when an event command is received that a scan of the first page for a job is completed, the BYOD application 431 may display the user interface window of FIG. 21. Referring to FIG. 21, the user interface window 2100 includes select area 2110 asking whether the scan job is to be performed on another page.

When a user selects the next page scan, the BYOD application 431 may perform the continue command of [PUT]{"condition": "jcWaitingForNextSegment," "disposition": "cvContinue," "data": { }}]" regarding the state of "jcWaitingForNextSegment." Thus, the image scan apparatus 300 may scan another page. When the scanning operation of the next page is completed, the user may select whether to scan another page.

When the user selects the option to stop scanning, the BYOD application 431 may perform the stop command of [PUT]{"condition": "jcWaitingForNextSegment," "disposition": "cvStop," "data": { }}]" for the "jcWaitingForNextSegment" state. Thus, the image scan apparatus may complete the current scanning operation, and store the finally generated file with the designated file name on the image scan apparatus 300. When the storing is completed, the image scan apparatus 300 may deliver a job completion state to the BYOD application 431 with the web socket method as the following job state modifying event in Jason format.

{"JobStateChangedEv":{"resourceId":90,"stateDetails": {"state":"jskJobCompleteStat e," "subState":"jsskSuccessful," "stateReasons": [{"reason":"jsrJobStatus," "cause": "jsrcSystem"}]}}}}}

Figure 22:
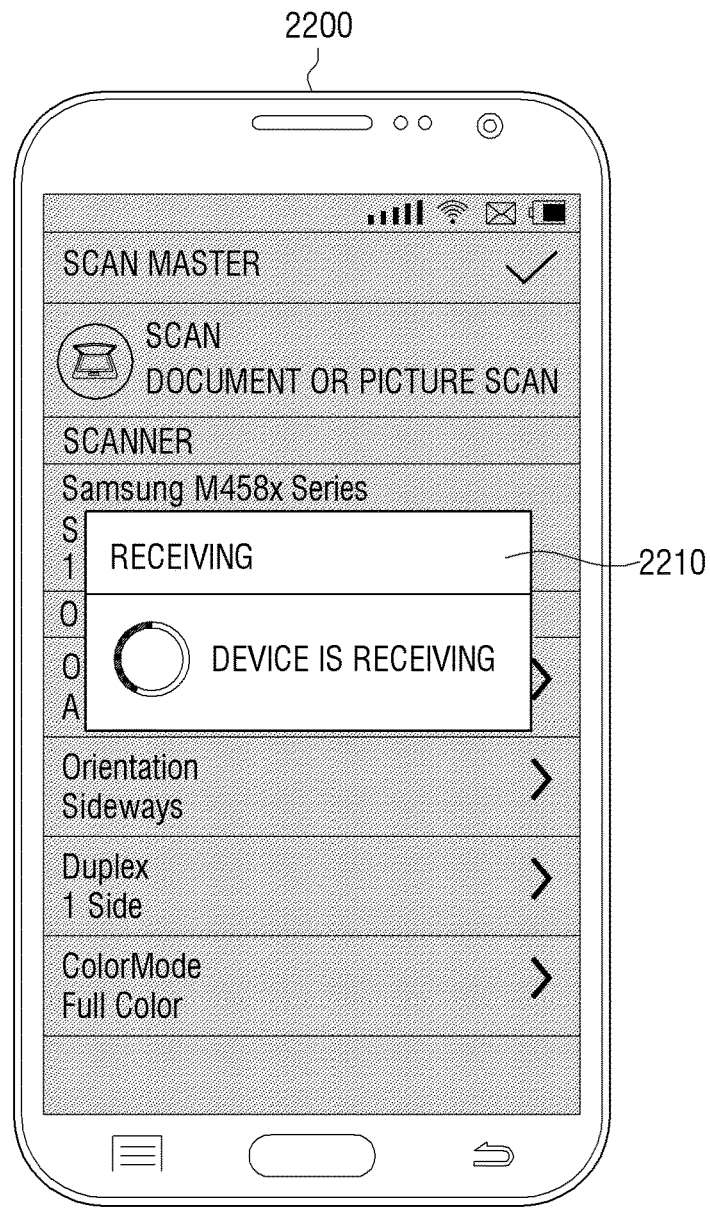

In this case, the BYOD application 431 may display the user interface window of FIG. 22. Referring to FIG. 22, the user interface window 2200 includes the area 2210 informing that the scanned image is being received.

When receiving the job completion event, the image scan apparatus 300 may transmit the scanned file to the mobile apparatus 100 through WebDav protocol, which is a file access protocol provided by a web server based on the file paths provided by the BYOD application 431.

Figure 23:
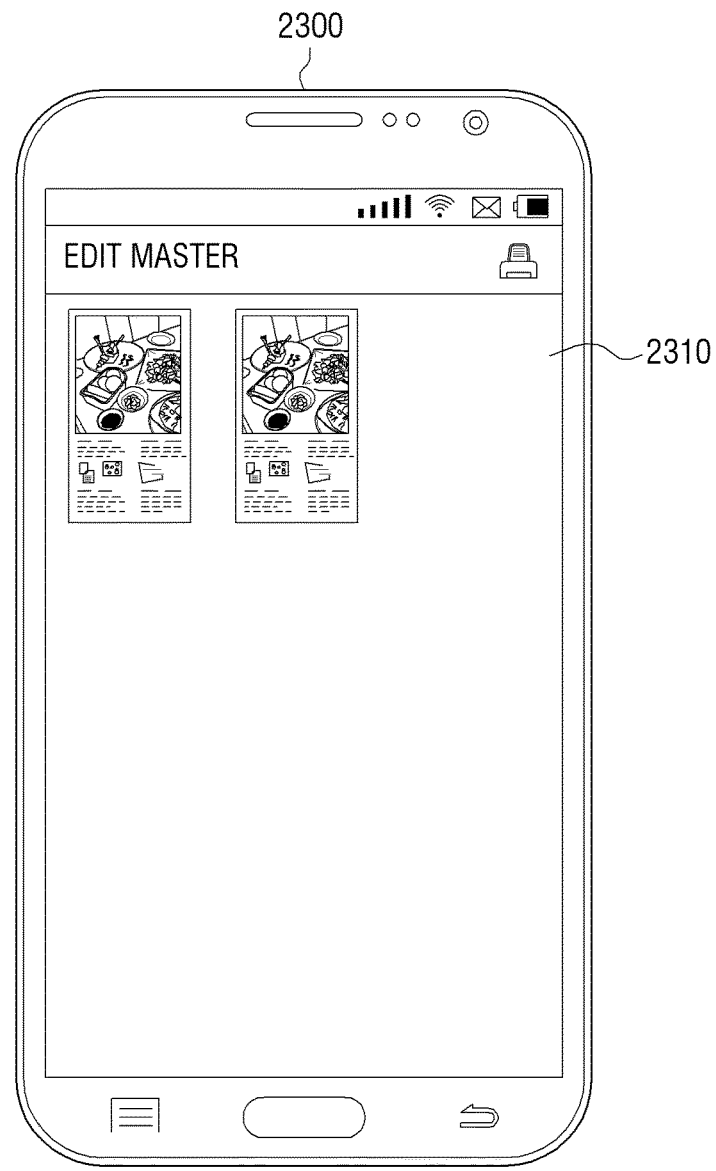

When the file transmission is completed, the BYOD application 431 may display the user interface window of FIG. 23.

Referring to FIG. 23, the user interface window 2300 includes the edit master screen 2310. Herein, the edit master screen 2310 is screen area where the image editing function is provided regarding the received scan images.

Figure 24:
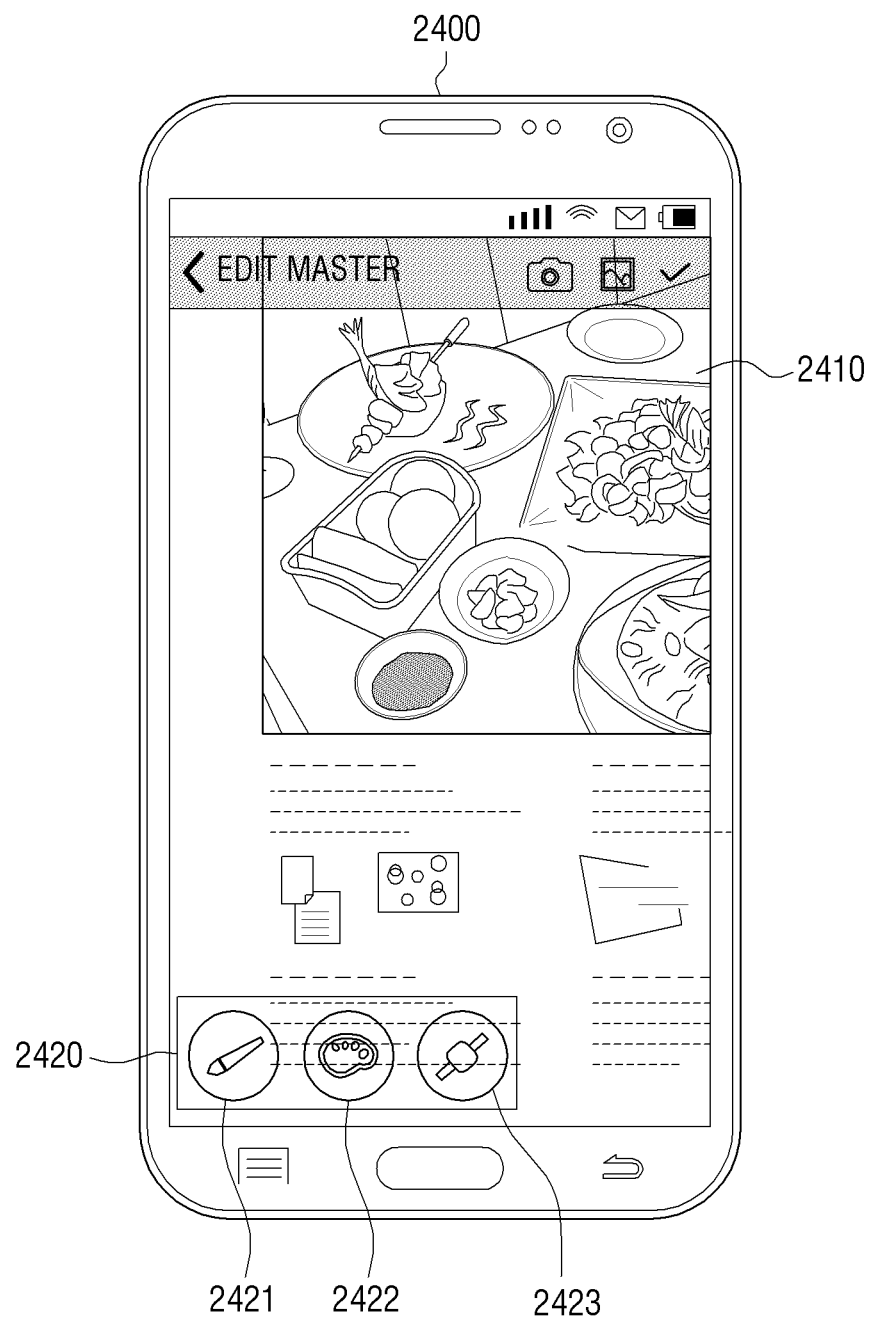

When a user selects one of the scan images displayed on the edit master screen 2310, the edit screen of FIG. 24 may be displayed.

FIG. 24 illustrates an example of the user interface window using the image revising function of the edit master for the scanned image.

Referring to FIG. 24, the user interface window 2400 includes area 2410 displaying the received scan images and corresponding edit icon area 2420.

Figure 25:
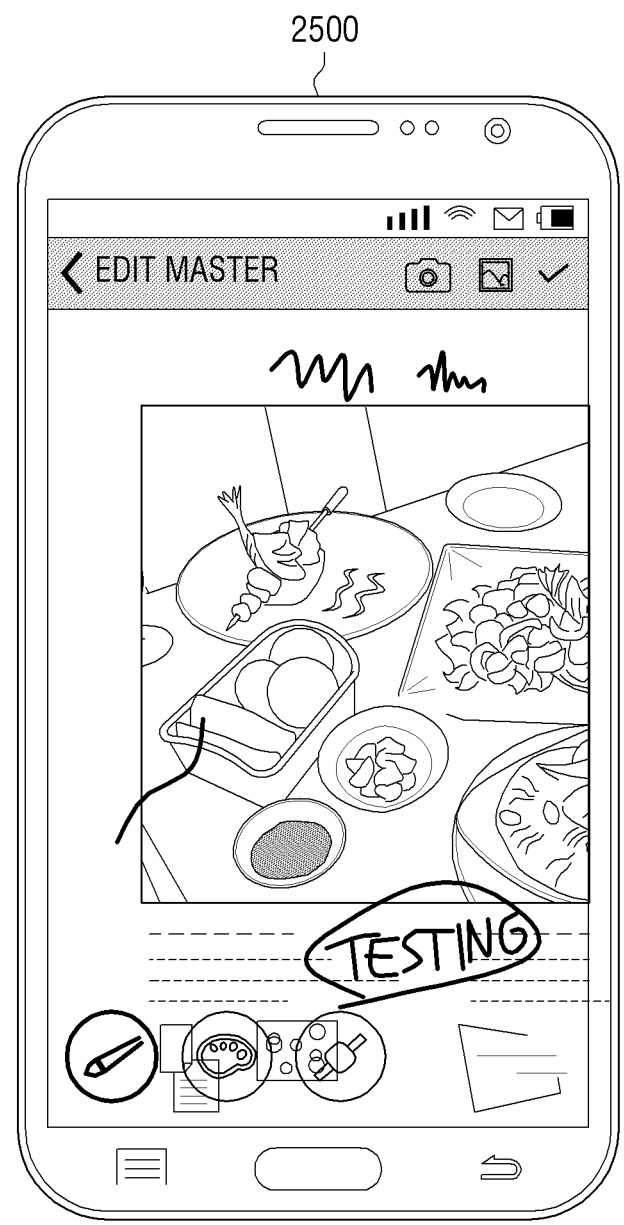

The edit icon area 220 may include various editing tools 2421, 2422, 2423. FIG. 25 illustrates a user editing the scan image by using the pen tool, which may be one of the editing tools 2421, 2422, 2423.

Referring to FIG. 25, regarding the user interface window 2500, the writing inputted by a user may be displayed on top of the scan image.

Figure 26:
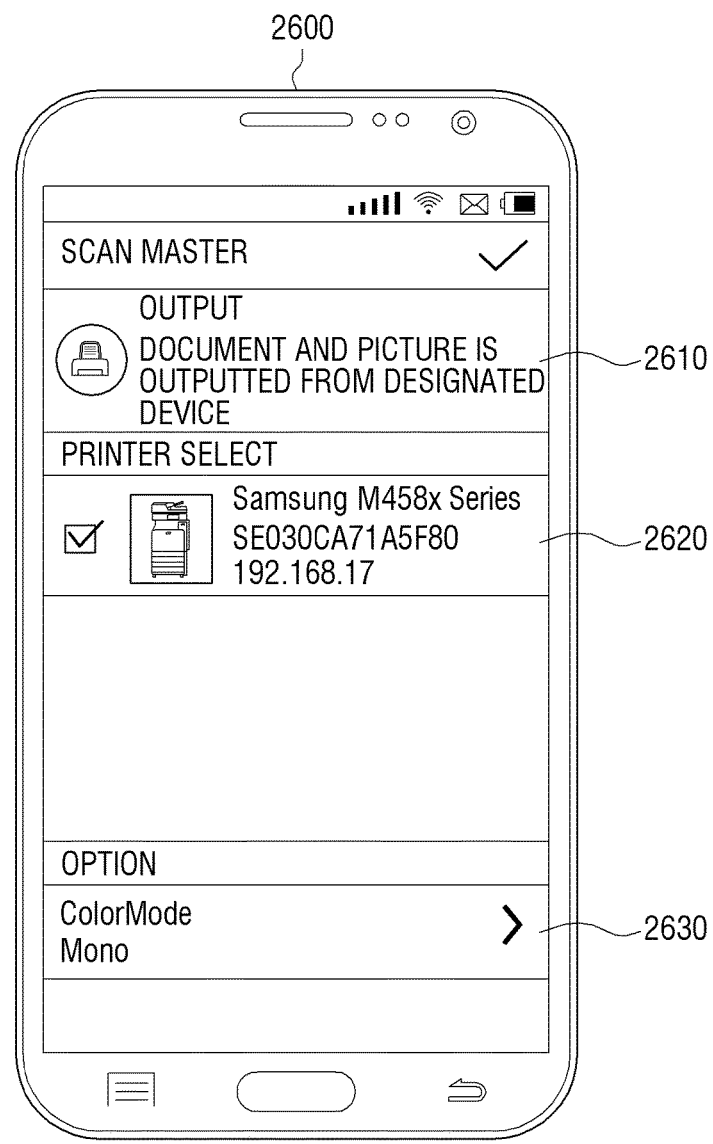
Figure 27:
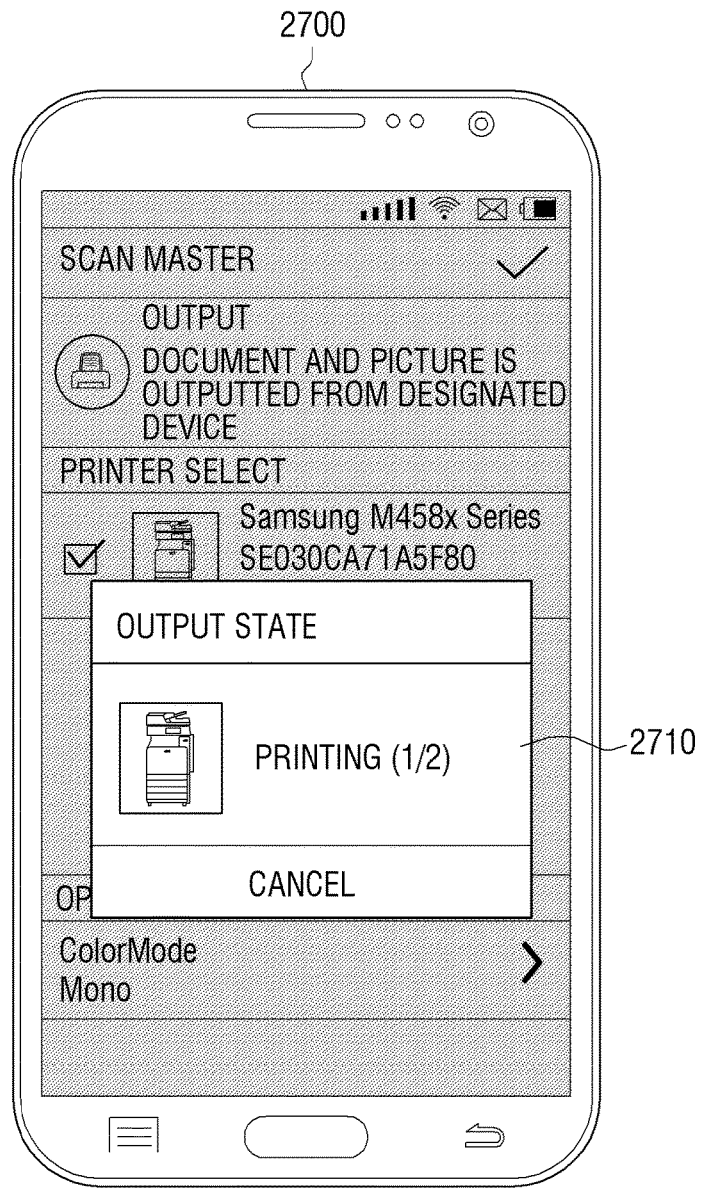
Figure 28:
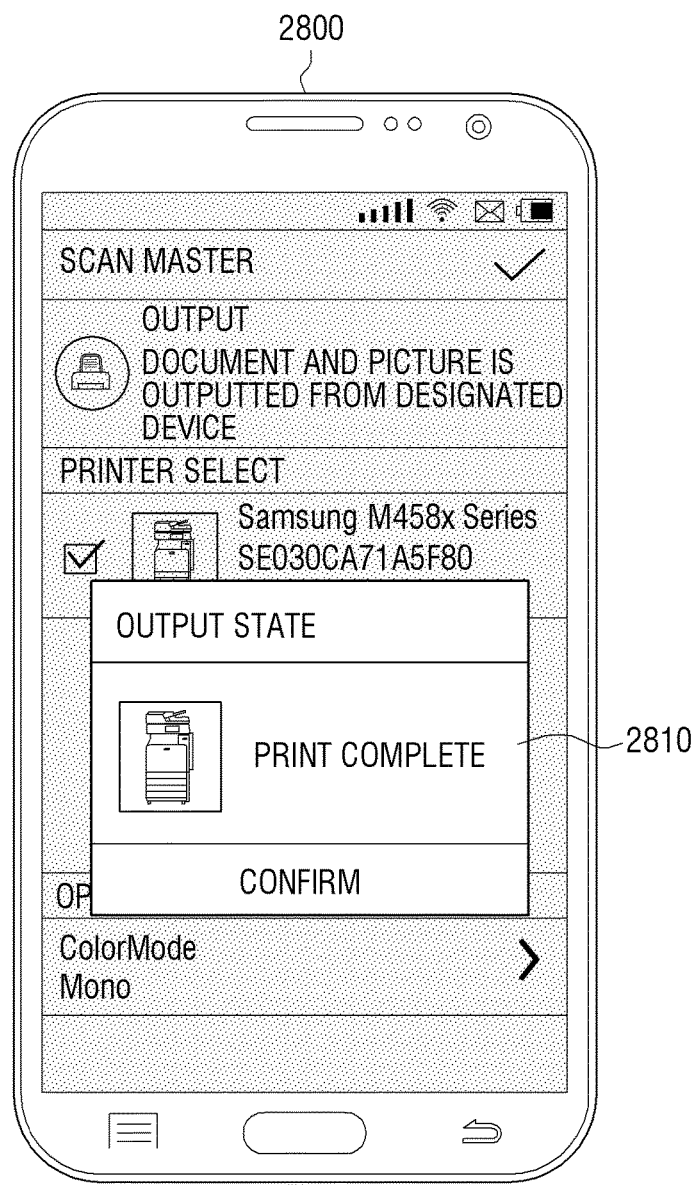

When the editing function is completed, a user may print the edited document. FIG. 26 illustrates the user interface window that may be displayed when a user inputs a print command regarding the edited document.

Specifically, FIG. 26 illustrates an example of the user interface window for printing the image edited via the edit master.

When a user selects the print button on the edit master screen, the user interface window 2600 may include the information area 2610 displaying the current job information, the device display area 2620 displaying a list of the currently connected devices, and the option select area 2630.

When an output command is inputted on the user interface window 2600, the BYOD application 431 may transmit the original data or the modified data stored in the mobile apparatus 100 to the connected image forming apparatus through UP, i.e., push print protocol.

The image forming apparatus receiving the corresponding data may perform the printing by analyzing the data from the mobile apparatus 100.

The BYOD application 431 may receive information regarding the state of the outputting job as job event and confirm whether to finish the current printing job and whether any error occurs. The BYOD application 431 may display the user interface window according to the received job state. Specifically, referring to FIGS. 27 and 28, the user interface window 2700, 2800 includes areas 2710, 2810 displaying the state of the current print job.

When a black and white MFP model supporting color scan only and a color printer supporting color printing can be used by a user, the user may be provided with the expansion function of scanning in color via the MFP model and printing in color via the color printer as one workflow through the BYOD application 431 of the mobile apparatus 100. The expansion function may be provided to combine the resources of a plurality of the image forming apparatuses (color scan resource of A device and color print resource of B device) and the resource of the mobile apparatus 100 (storage of the mobile apparatus/basic applications installed in the mobile apparatus) as one workflow through UI of the BYOD application 431 installed on the mobile apparatus 100.

Figure 29:
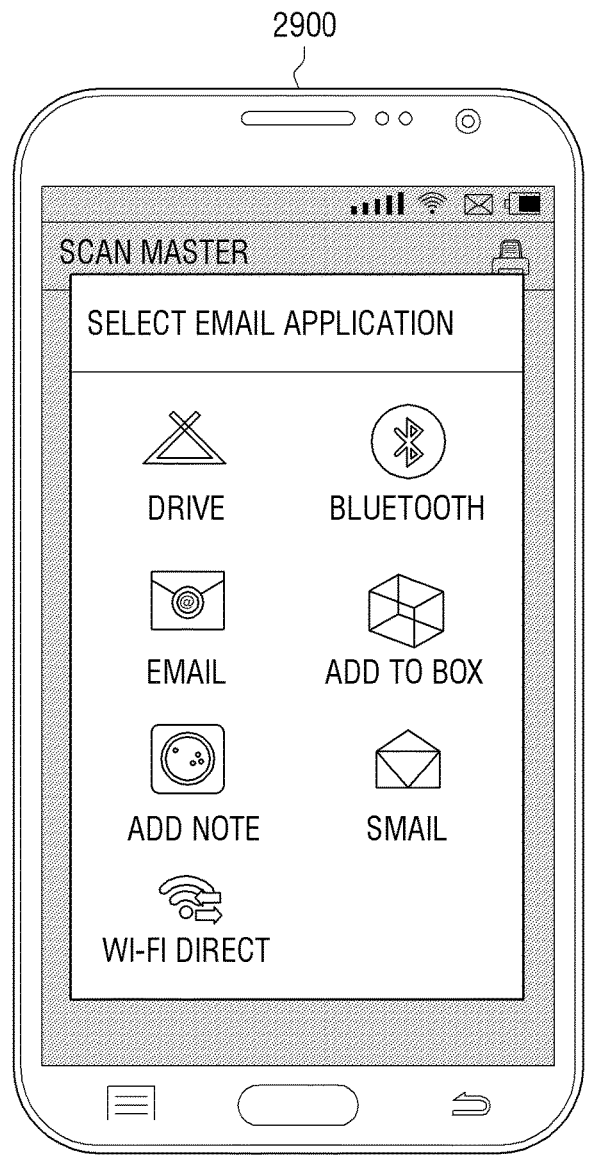
Figure 30:
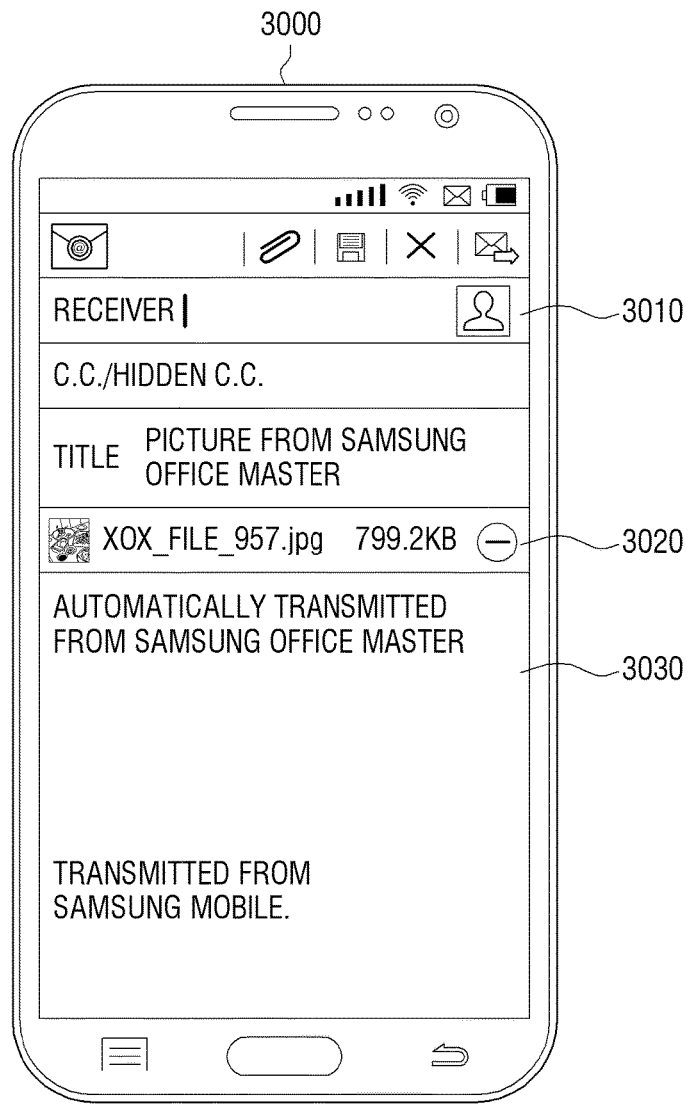

FIGS. 29 and 30 are diagrams provided to explain an example of transmitting by email the image that was edited through the edit master.

In this case, the BYOD application 431 may email the image to the recipient designated by the user by adding the edited image data previously stored in the mobile apparatus 100 and by utilizing the email application in the mobile apparatus 100.

Referring to FIG. 29, the user interface 2900 may display various email applications that can be selected by a user. When the user selects an application, the user interface window of FIG. 30 may be displayed.

Referring to FIG. 30, the user interface window 3000 may include the address area 3010 for the recipient's email address, added file area 3020, and text area 3030.

Through the above expansion function, the email transmitting can be provided by using the device that does not provide the email service. Further, regarding the device providing the email function, a function expanded more than that of the email function which the related set provides can be performed by using the resource of the mobile apparatus and the edit function regarding the image which the image scan apparatus cannot provide.

Figure 31:
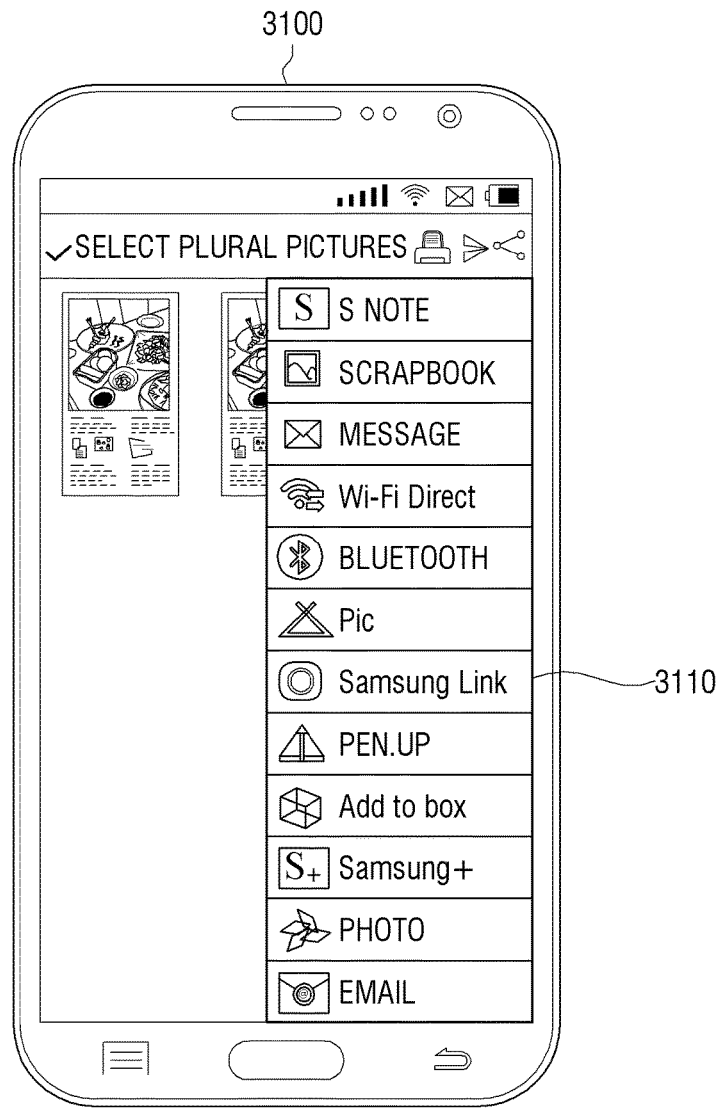

FIG. 31 is a diagram provided to explain an example of performing the sharing function regarding the image in which editing is performed through the edit master.

When a user selects the share button on the edit master screen, the BYOD application 431 may display a list of mobile applications installed in the mobile apparatus 100, and display an application list that can transmit files, as illustrated in FIG. 31.

Referring to FIG. 31, the user interface window 3100 may display a list 3110 of the sharing applications that can be selected by a user.

When a sharing application is selected from the displayed list, the BYOD application 431 may transmit the corresponding image data stored in the mobile apparatus 100 to the sharing application while executing the selected sharing application.

The process after the transmitting may be performed according to the sharing application. For example, when the user selects the S-note application as the sharing application, the user interface window of FIG. 32 may be displayed.

Figure 32:
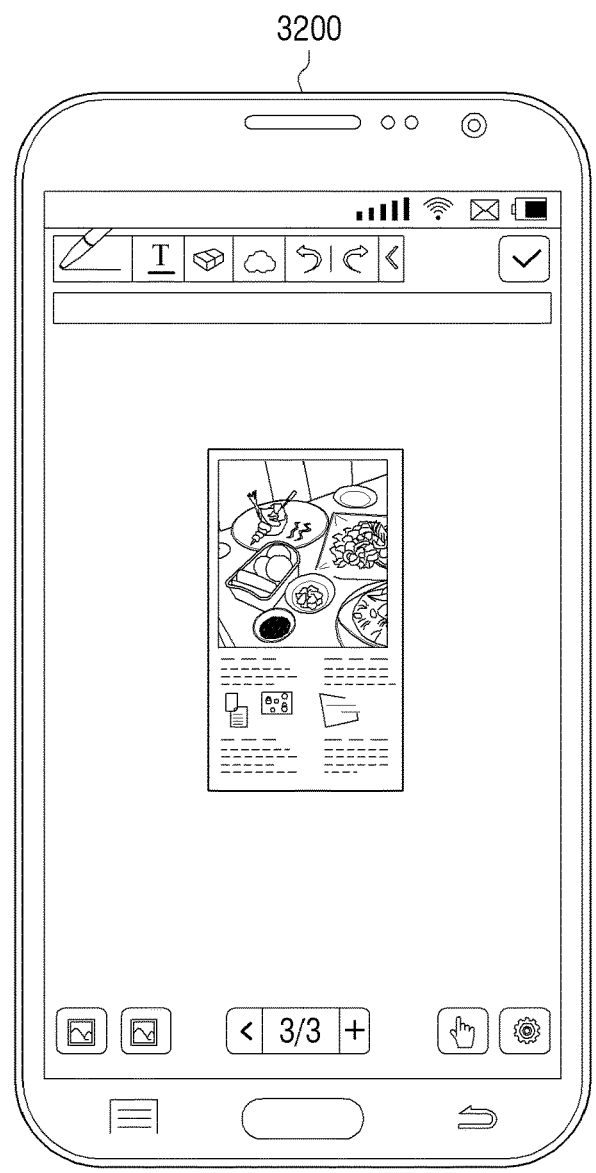

Referring to FIG. 32, the user interface window 3200 may display the S-note application UI screen. The S-note application may display the scan image delivered from the BYOD application 431.

Through the expansion function described above, the BYOD application 431 may process the image generated at the connected device and transmit the image to another mobile application as one job workflow by expanding the sharing function of the mobile applications for the image stored in the mobile apparatus 100. Accordingly, user convenience can be enhanced by improving the process in which an image generated at a first device can be shared by using the capabilities of, for example, the mobile apparatus 100 connected to the first device.

Figure 33:
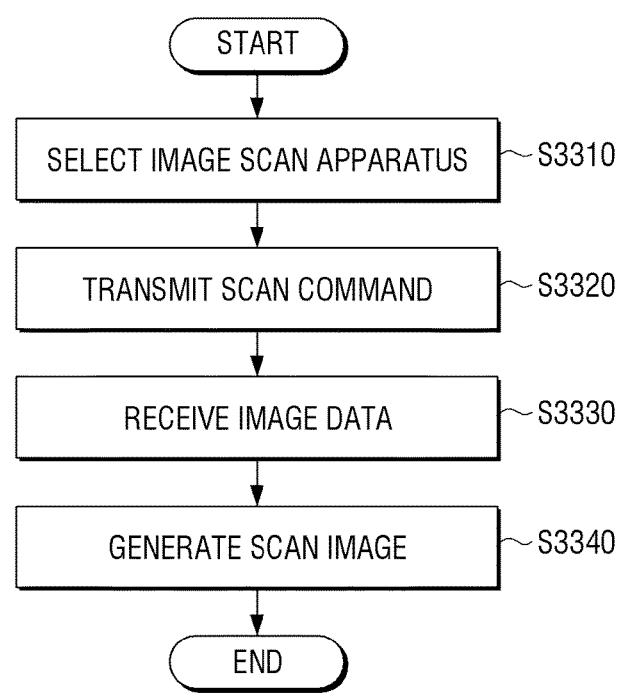
FIG. 33 is a diagram provided to explain a method for processing a job with the mobile apparatus according to an embodiment.

FIG. 33 is a diagram provided to explain a job performing method of a mobile apparatus according to an embodiment.

Referring to FIG. 33, an image scan apparatus to execute a job may be selected at S3310. Specifically, a mobile apparatus may display the image scan apparatuses that can be connected, and receive a selection of one of the displayed image scan apparatuses.

At S3320 a job execute request may be transmitted to the selected image scan apparatus. The job execute request may include an open API command that can be identified by the image scan apparatus, and transmitted by using an UP of the image scan apparatus.

At S3330 a plurality of the image data constituting the job result may be streamed by the image scan apparatus with the streaming method.

At S3340 the job result using a plurality of the received image data may be generated. When the job result is generated, the job result may be transmitted to another image scan apparatus or to a user so that an editing operation can be performed.

Thus, because the job performing method of the mobile apparatus according to an embodiment may generate the entire scan image on the mobile apparatus, the image scan apparatus having limited available storage can easily scan without regard to the limited available storage. The job performing method of FIG. 33 may be implemented in the mobile apparatus of FIGS. 2 and 3 or other configurations for other embodiments of the present disclosure.

The job performing method according to the above various embodiments may be stored in non-transitory computer readable recording medium. Non-transitory computer readable recording medium may be loaded and used on various devices.

The non-transitory computer readable recording medium indicate medium that store data permanently and/or semi-permanently and can be read by devices, not media that can only store data temporarily such as, for example, registers, caches, or dynamic memory. Specifically, the above various applications or programs may be stored and provided in non-transitory computer readable recording medium such as CD, DVD, hard disk, Blu-ray disk, USB, memory card, or ROM.

Figure 34:
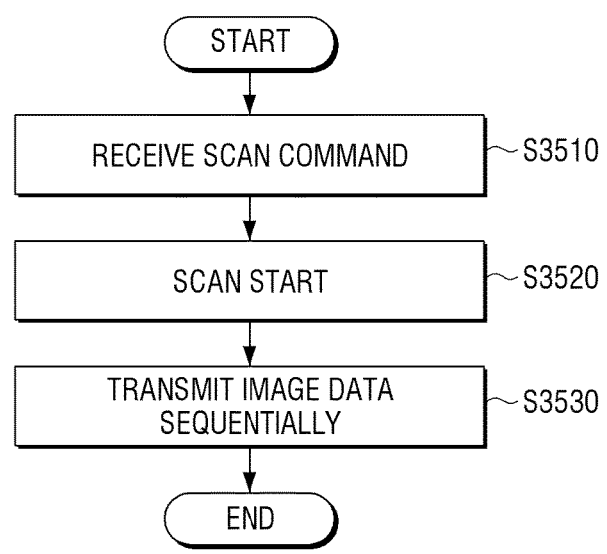
FIG. 34 is a diagram provided to explain a method for processing a job with the image scan apparatus according to an embodiment.

FIG. 34 is a diagram provided to explain a job performing method of an image scan apparatus according to an embodiment.

Referring to FIG. 34, a scan command may be received from a mobile apparatus at S3510. The scan command may be an open API command that can be identified by an image scan apparatus.

At S3520 the source material may be scanned based on a plurality of image data. Specifically, the image data regarding the source material may be generated by using the scan buffer, and the scanning may be stopped when the image data fills the scan buffer. When the image data in the scan buffer is copied to another device, the scanning may start again. Thus, the image data may correspond to the size of the scan buffer.

At S3530, a plurality of the image data that are consecutively generated may be transmitted to the mobile apparatus with the streaming method.

Thus, the job performing method of the image scan apparatus according to an embodiment may transmit the image data stored in the scan buffer of the image scan apparatus to the mobile apparatus at real time with the streaming method. Accordingly, even when the image scan apparatus does not have storage space to store the scanned output, scanning can still be performed. The job performing method of FIG. 34 may be performed by, for example, the image scan apparatus of FIG. 4, or other configurations depending on various embodiments of the present disclosure.

The job performing method of the image scan apparatus according to various embodiments may be stored in non-transitory computer readable recording medium. The non-transitory computer readable recording medium can be mounted and used in various devices.

The described embodiments described are merely exemplary and are not to be construed as limiting any other embodiments. The present teaching can be readily applied to other types of apparatuses. Also, the description of the various embodiments in the present disclosure is intended to be illustrative, and not to limit the scope of any claims.

What is claimed is:

1. A mobile apparatus, comprising:
a user interface to allow a user to select an image scan apparatus;
a communication interface to transmit position information and time information of the mobile apparatus to the selected image scan apparatus, transmit a scan command to the selected image scan apparatus, and receive a plurality of pieces of image data having the position information and time information of the mobile apparatus from the selected image scan apparatus via a streaming method; and
a controller to generate a scan image using the plurality of pieces of image data having the position information and time information of the mobile apparatus,
wherein
a size of each of the plurality of pieces of image data is limited by a size of a scan buffer of the image scan apparatus,
for each of the plurality of pieces of image data, the communication interface is to receive an event message from the image scan apparatus while a scanning operation of the image scan apparatus is stopped indicating the scan buffer is full and a respective piece of image data among the plurality of pieces of image data is ready for retrieval, and
the communication interface is to transmit a request to the image scan apparatus to retrieve the respective piece of image data in response to receiving the event message.

2. The mobile apparatus of claim 1, wherein
the communication interface is to receive a completion message when all of the plurality of pieces of image data are received from the image scan apparatus, and
the controller is to generate the scan image in response receiving the completion message.

3. The mobile apparatus of claim 1, wherein the communication interface is to communicate with the selected image scan apparatus with a unified protocol.

4. The mobile apparatus of claim 3, wherein the scan command comprises open Application Programming Interface (API) commands recognized by the selected image scan apparatus.

5. The mobile apparatus of claim 1, wherein the controller is to control the communication interface to transmit the generated scan image to the selected image scan apparatus and to an image forming apparatus.

6. The mobile apparatus of claim 1, wherein the user interface is to receive an edit command regarding the generated scan image, and the controller is to edit the generated scan image in response to the received edit command.

7. The mobile apparatus of claim 1, wherein the controller is to control the communication interface to transmit the generated scan image to at least one of an email transmission server, a fax transmission server, or a file transport protocol (FTP) server.

8. The mobile apparatus of claim 1, wherein
the communication interface is to receive address book information stored in the image scan apparatus from the image scan apparatus,
the user interface is to display an address book corresponding to the received address book information and receive selecting of at least one address from the displayed address book, and
the controller is to control the communication interface to transmit the generated scan image to the at least one address corresponding to the selected address.

9. The mobile apparatus of claim 1, further comprising a storage device to store address book information,
wherein
the user interface is to receive selecting of at least one address book corresponding to the stored address book information, and
the communication interface is to transmit address information corresponding to the selected address book to the selected image scan apparatus.

10. The mobile apparatus of claim 1, further comprising a position measuring sensor to generate the position information by measuring a position of the mobile apparatus.

11. The mobile apparatus of claim 1, wherein the controller is to perform a text recognition function on the generated scan image.

12. The mobile apparatus of claim 1, wherein
the communication interface is to receive a document file stored in the selected image scan apparatus from the selected image scan apparatus,
the user interface is to receive an edit command regarding the received document file, and
the controller is to edit the received document file according to the edit command and control the communication interface to transmit the edited document file to the image scan apparatus.

13. An image scan apparatus, comprising:
a communication interface to receive a scan command from a mobile apparatus and to receive time information and position information of the mobile apparatus from the mobile apparatus;
a scanner to scan a source material to a plurality of pieces of image data;
a controller to reflect the received time information and the received position information of the mobile apparatus into the plurality of pieces of image data, and to control the communication interface to transmit the plurality of pieces of image data, having the time information and position information of the mobile apparatus reflected therein, to the mobile apparatus via a streaming method; and
a scan buffer to store each piece of image data output by the scanner,
wherein when a piece of image data output by the scanner fills the scan buffer, the controller is to:
control the scanner to stop scanning the source material,
to control the communication interface to transmit an event message to the mobile apparatus while the scanner is stopped indicating the scan buffer is full and the piece of image data is ready for retrieval,
in response to receiving a request from the mobile apparatus to retrieve the piece of image data, to control the communication interface to transmit the piece of image data stored in the scan buffer having the time information and position information of the mobile apparatus reflected therein to the mobile apparatus, and
to control the scanner to re-start scanning the source material when the scan buffer is empty.

14. A job performing method of a mobile apparatus, comprising:
receiving a selection of an image scan apparatus to perform scanning of a document;
transmitting a scan command to the selected image scan apparatus;
transmitting position information and time information of the mobile apparatus to the selected image scan apparatus;
receiving a plurality of pieces of image data having the position information and time information of the mobile apparatus from the selected image scan apparatus via a streaming method, the plurality of pieces of image data corresponding to the document having been scanned by the image scan apparatus; and
generating a scan image using the plurality of pieces of image data having the position information and time information of the mobile apparatus,
wherein the receiving the plurality of pieces of image data includes:
for each of the plurality of pieces of image data, receiving an event message from the image scan apparatus while a scanning operation of the image scan apparatus is stopped indicating a scan buffer of the image scan apparatus is full and a respective piece of image data among the plurality of pieces of image data is ready for retrieval, and
in response to receiving the event message, transmitting a request to the image scan apparatus to retrieve the respective piece of image data,
wherein a size of each of the plurality of pieces of image data is limited by a size of the scan buffer of the image scan apparatus.

15. The job performing method of claim 14, wherein
the receiving the plurality of pieces of image data further includes receiving a completion message when all of the plurality of pieces of image data are received from the image scan apparatus, and
the generating the scan image is performed in response to receiving the completion message.

16. The job performing method of claim 14, wherein transmitting the scan command and receiving the plurality of pieces of image data comprises transmitting and receiving the scan command and the plurality of pieces of image data, respectively, by using a unified protocol that transmits the scan command and the plurality of pieces of image data to a same port.

17. The job performing method of claim 16, wherein the scan command comprises open Application Programming Interface (API) commands recognized by the selected image scan apparatus.

18. The job performing method of claim 14, further comprising:
executing a bring your own device (BYOD) application installed on the mobile apparatus; and
receiving user interface contents from the image scan apparatus for displaying on a display of the mobile apparatus to implement a scan function of the image scan apparatus via the BYOD application,
wherein the transmitting the scan command and the receiving the plurality of pieces of image data having the position information and time information of the mobile apparatus are performed using the BYOD application.

19. The job performing method of claim 14, wherein
the receiving the plurality of pieces of image data method comprises:
receiving a first piece of image data among the plurality of pieces of image data having a size that corresponds to the size of the scan buffer of the image scan apparatus, the first piece of image data corresponding to a first portion of the document, and
receiving a second piece of image data among the plurality of pieces of image data having a size that corresponds to the size of the scan buffer of the image scan apparatus, the second piece of image data corresponding to a second portion of the document, and
the generating the scan image comprises combining the first piece of image data with the second piece of image data.

20. The job performing method of claim 14, further comprising:
executing a bring your own device (BYOD) application installed on the mobile apparatus;
performing a discovery operation to search for image scan apparatuses which support the BYOD application;

displaying, on a user interface of the mobile apparatus, image scan apparatuses which support the BYOD application based on a result of the performing the discovery operation, the selected image scan apparatus being selected from among the image scan apparatuses displayed on the user interface which support the BYOD application; and performing a pairing operation between the mobile apparatus and the selected image scan apparatus.

* * * * *